US008787750B2

(12) United States Patent  
Zi

(10) Patent No.: US 8,787,750 B2
(45) Date of Patent: Jul. 22, 2014

(54) INFORMATION PROCESSING METHOD IN OPTICAL NETWORK, OPTICAL COMMUNICATION APPARATUS AND SYSTEM

(75) Inventor: Xiaobing Zi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 320 days.

(21) Appl. No.: 13/410,818

(22) Filed: Mar. 2, 2012

(65) Prior Publication Data

US 2012/0163803 A1   Jun. 28, 2012

Related U.S. Application Data

(63) Continuation of application No. PCT/CN2010/076634, filed on Sep. 6, 2010.

(30) Foreign Application Priority Data

Sep. 4, 2009 (CN) .......................... 2009 1 0168988
Jun. 7, 2010 (CN) .......................... 2010 1 0200961

(51) Int. Cl.
    *H04B 10/00* (2013.01)
(52) U.S. Cl.
    USPC ...................................... 398/1; 398/3; 398/5
(58) Field of Classification Search
    USPC .......................................................... 398/1–8
    See application file for complete search history.

(56) References Cited

U.S. PATENT DOCUMENTS

| | | | |
|---|---|---|---|
| 7,277,631 B1* | 10/2007 | Iyer et al. .......................... 398/1 |
| 2002/0003639 A1* | 1/2002 | Arecco et al. ................. 359/119 |
| 2002/0114031 A1* | 8/2002 | Yamada ........................ 359/119 |
| 2003/0189895 A1 | 10/2003 | Limaye et al. |
| 2004/0076114 A1* | 4/2004 | Miriello et al. ................ 370/222 |
| 2005/0088963 A1* | 4/2005 | Phelps et al. ................... 370/216 |
| 2006/0188251 A1* | 8/2006 | Chan et al. ......................... 398/4 |
| 2007/0292129 A1* | 12/2007 | Yan et al. ........................... 398/5 |

(Continued)

FOREIGN PATENT DOCUMENTS

CN   1588890       3/2005
CN   1870480 A    11/2006

(Continued)

OTHER PUBLICATIONS

International Search Report mailed Dec. 16, 2010 for related PCT Patent Application No. PCT/CN2010/076634, filed Sep. 6, 2010.

(Continued)

*Primary Examiner* — Agustin Bello

(57) ABSTRACT

An information processing method is disclosed according to the embodiments of the present invention. The method includes: A node receives a first message from overhead of a first dimension; the node searches for local configuration information, where the local configuration information includes the overhead of the first dimension of a protection path, a protection resource of the first dimension of the protection path, overhead of a second dimension of the protection path, and a protection resource of the second dimension of the protection path; according to the local configuration information and the first message, the node determines a protection path correlated with the first message and determines overhead of the second dimension correlated with the first message; and the node sends a second message to a node adjacent to the second dimension through the overhead of the second dimension correlated with the first message, according to the first message.

13 Claims, 17 Drawing Sheets

(56) References Cited

U.S. PATENT DOCUMENTS

2008/0069563 A1* 3/2008 Wang .............................. 398/59
2010/0014417 A1* 1/2010 Zhou ............................. 370/223
2012/0163803 A1* 6/2012 Zi ................................... 398/17

FOREIGN PATENT DOCUMENTS

| CN | 1984045 | 6/2007 |
|---|---|---|
| CN | 101447848 | 6/2009 |
| EP | 1890406 A1 | 2/2008 |

OTHER PUBLICATIONS

Written Opinion of the International Searching Authority mailed Dec. 16, 2010 for related PCT Patent Application No. PCT/CN2010/076634, filed Sep. 6, 2010.

Partial translation of Office Action dated Feb. 1, 2013 in connection with Chinese Patent Application No. 201010200961.9.

Extended European Search Report dated Nov. 30, 2012 in connection with European Patent Application No. 10813364.6, 6 pages.

* cited by examiner

Bytes of APS overhead

US 8,787,750 B2

INFORMATION PROCESSING METHOD IN OPTICAL NETWORK, OPTICAL COMMUNICATION APPARATUS AND SYSTEM

CROSS-REFERENCE TO RELATED APPLICATIONS

This application is a continuation of International Application No. PCT/CN2010/076634, filed on Sep. 6, 2010, which claims priority to Chinese Patent Application No. 200910168988.1, filed on Sep. 4, 2009 and Chinese Patent Application No. 201010200961.9, filed on Jun. 7, 2010, all of which are hereby incorporated by reference in their entireties.

FIELD OF THE INVENTION

The present invention relates to the field of optical communications technologies, and in particular, to an information processing method in an optical network, and an optical communication apparatus and system.

BACKGROUND OF THE INVENTION

Currently, optical networks are applied widely. The optical transport network (OTN, Optical Transport Network) technology is a new optical transport technology, which is capable of scheduling and managing large-capacity services flexibly, and has now become a mainstream technology of the backbone transport network.

In an optical network, it is generally necessary to ensure reliability of connections inside the network, which may be implemented through various protection and recovery technologies. For example, an optical network connection may be recovered through a rerouting technology of a control plane. Besides, a shared mesh (Mesh) recovery technology provided by the control plane may be utilized. Taking the shared Mesh recovery technology as an example, each shared Mesh service generally includes a working path and a protection path, and such paths are made up of connections. In the prior art, when the working path of the shared Mesh service fails, a protection path may be set up by using a control-plane signaling protocol such as Generalized Multi-Protocol Label Switching Resource Reservation Protocol with TE (GMPLS RSVP-TE, Generalized Multi-Protocol Label Switching Resource Reservation Protocol with TE), and the service is switched to the protection path for transmission, so as to recover the service. In an OTN network, a control channel may be provided by overhead bytes. The signaling message of the control plane may be transmitted by the control channel. The overhead of an Optical Supervisory Channel (OSC, Optical Supervisory Channel) may provide a control channel between nodes of the optical network. In this case, a control interface is generated between the nodes, and a routing protocol (such as Open Shortest Path First (OSPF, Open Shortest Path First) protocol) runs on the control interface, and therefore, a routing table of the control plane can be obtained, and signaling protocol messages can be transmitted between nodes. For example, when an initial node discovers failure of a working path of a certain service (the working path is a path established between the initial node and a destination node), a path (Path) message (encapsulated in an IP packet) is sent to another intermediate node through the control channel. The intermediate node resolves the Path message and sets up a connection, and then forwards the Path message to the destination node. The destination node resolves the Path message and sets up a connection, and then switches the service onto the protection path formed by newly established connections. The destination node returns a reservation (Resv, Reservation) message to the initial node through the intermediate node, and according to the received Resv message, the initial node can switch the service onto the protection path formed by the newly established connection. In this way, the service is recovered.

In the process of researching and practicing such a method, the inventor of the present invention finds that: Because the service recovery process in the prior art requires participation of the control plane, but the messages of the control plane protocol stack such as GMPLS RSVP-TE signaling protocol are rather complicated, the process of resolving the messages to obtain information is rather complicated.

SUMMARY OF THE INVENTION

An embodiment of the present invention provides an information processing method in an optical network, and an optical communication apparatus and system, to reduce information processing complexity.

An embodiment of the present invention provides an information processing method in an optical network, including:
receiving, by a node, a first message from overhead of a first dimension;
searching for, by a node, local configuration information, where the local configuration information includes the overhead of the first dimension of a protection path, a protection resource of the first dimension of the protection path, overhead of a second dimension of the protection path, and a protection resource of the second dimension of the protection path; and according to the local configuration information and the first message, determining a protection path correlated with the first message and determining overhead of a second dimension correlated with the first message; and
sending a second message to a node adjacent to the second dimension through the overhead of the second dimension correlated with the first message, according to the first message.

An embodiment of the present invention provides an information processing method in an optical network, including:
receiving, by a node, a third message from overhead of a first dimension;
searching for, by a node, local configuration information, where the local configuration information includes the overhead of the first dimension of a protection path and a protection resource of the first dimension of the protection path; and determining a protection path correlated with the third message according to the local configuration information and the third message;
setting up a cross-connection for the protection path correlated with the third message if the third message is a protection switching message; and
recording a state of the protection path correlated with the third message if the third message is a protection path state message.

An embodiment of the present invention provides an information processing method in an optical network, including:
determining, by a node, a protection path upon detecting failure of a working path;
searching for, by a node, local configuration information, where the local configuration information includes overhead of a second dimension of the protection path and a protection resource of the second dimension of the protection path; and determining overhead of the second dimension of the protection path according to the local configuration information; and sending a fourth message to a node adjacent to the second dimension through the overhead of the second dimension of the protection path, where the fourth message is a protection switching message.

An embodiment of the present invention provides an optical communication apparatus, including:

a message receiving unit, configured to receive a first message from overhead of a first dimension;

a path determining unit, configured to: search for local configuration information, where the local configuration information includes the overhead of the first dimension of a protection path, a protection resource of the first dimension of the protection path, overhead of a second dimension of the protection path, and a protection resource of the second dimension of the protection path; and according to the local configuration information and the first message, determine a protection path correlated with the first message and determine overhead of the second dimension correlated with the first message; and a message processing unit, configured to send a second message to a node adjacent to the second dimension through the overhead of the second dimension correlated with the first message, according to the first message.

An embodiment of the present invention provides an optical communication apparatus, including:

a message receiving unit, configured to receive a third message from overhead of a first dimension;

a path determining unit, configured to search for local configuration information, where the local configuration information includes the overhead of the first dimension of a protection path and a protection resource of the first dimension of the protection path; and determine a protection path correlated with the third message according to the local configuration information and the third message; and a message processing unit, configured to set up a cross-connection for the protection path correlated with the third message if the third message is a protection switching message, and record a state of the protection path correlated with the third message if the third message is a protection path state message.

An embodiment of the present invention provides an optical communication apparatus, including:

a path determining unit, configured to determine a protection path upon detecting failure of a working path;

an overhead determining unit, configured to search for local configuration information, where the local configuration information includes overhead of a second dimension of the protection path and a protection resource of the second dimension of the protection path; and determine overhead of the second dimension of the protection path according to the local configuration information; and a message sending unit, configured to send a fourth message to a node adjacent to the second dimension through the overhead of the second dimension of the protection path, where the fourth message is a protection switching message.

An embodiment of the present invention provides an optical communication system, including:

a first optical communication apparatus, configured to: determine a protection path upon detecting failure of a working path; search for local configuration information, where the local configuration information includes overhead of a second dimension of the protection path and a protection resource of the second dimension of the protection path; and determine overhead of the second dimension of the protection path in the first optical communication apparatus according to the local configuration information; and send a fourth message to a node adjacent to the second dimension of the first optical communication apparatus through the overhead of the second dimension of the protection path in the first optical communication apparatus, where the fourth message is a protection switching message; and a second optical communication apparatus, configured to: receive a third message from overhead of a first dimension of the second optical communication apparatus; search for local configuration information, where the local configuration information includes the overhead of the first dimension of the protection path and a protection resource of the first dimension of the protection path; and determine a protection path correlated with the third message according to the local configuration information and the third message, where the third message is a protection switching message; and set up a cross-connection for the protection path correlated with the third message.

The foregoing technical solutions reveal that in the technical solutions of the present invention, the node receives the first message from the overhead of the first dimension; the node searches for the local configuration information, where the local configuration information includes the overhead of the first dimension of the protection path, the protection resource of the first dimension of the protection path, the overhead of the second dimension of the protection path, and the protection resource of the second dimension of the protection path; according to the local configuration information and the first message, the node determines the protection path correlated with the first message and determines the overhead of the second dimension correlated with the first message; and the node sends the second message to the node adjacent to the second dimension through the overhead of the second dimension correlated with the first message, according to the first message. Because overhead is sent through a data plane to indicate recovery information, a signaling protocol is generally simple; moreover, local configuration information is set locally and can be used for searching for relevant information. In this way, the recovery information can be obtained easily, and information processing complexity is reduced.

BRIEF DESCRIPTION OF THE DRAWINGS

To describe the technical solutions of the present invention or the prior art more clearly, the following outlines the accompanying drawings involved in the description of the embodiments of the present invention or the prior art. Apparently, the accompanying drawings outlined below are merely about some embodiments of the present invention. Persons of ordinary skill in the art can derive other drawings from them without making any creative effort.

DETAILED DESCRIPTION OF THE EMBODIMENTS

Figure 1:
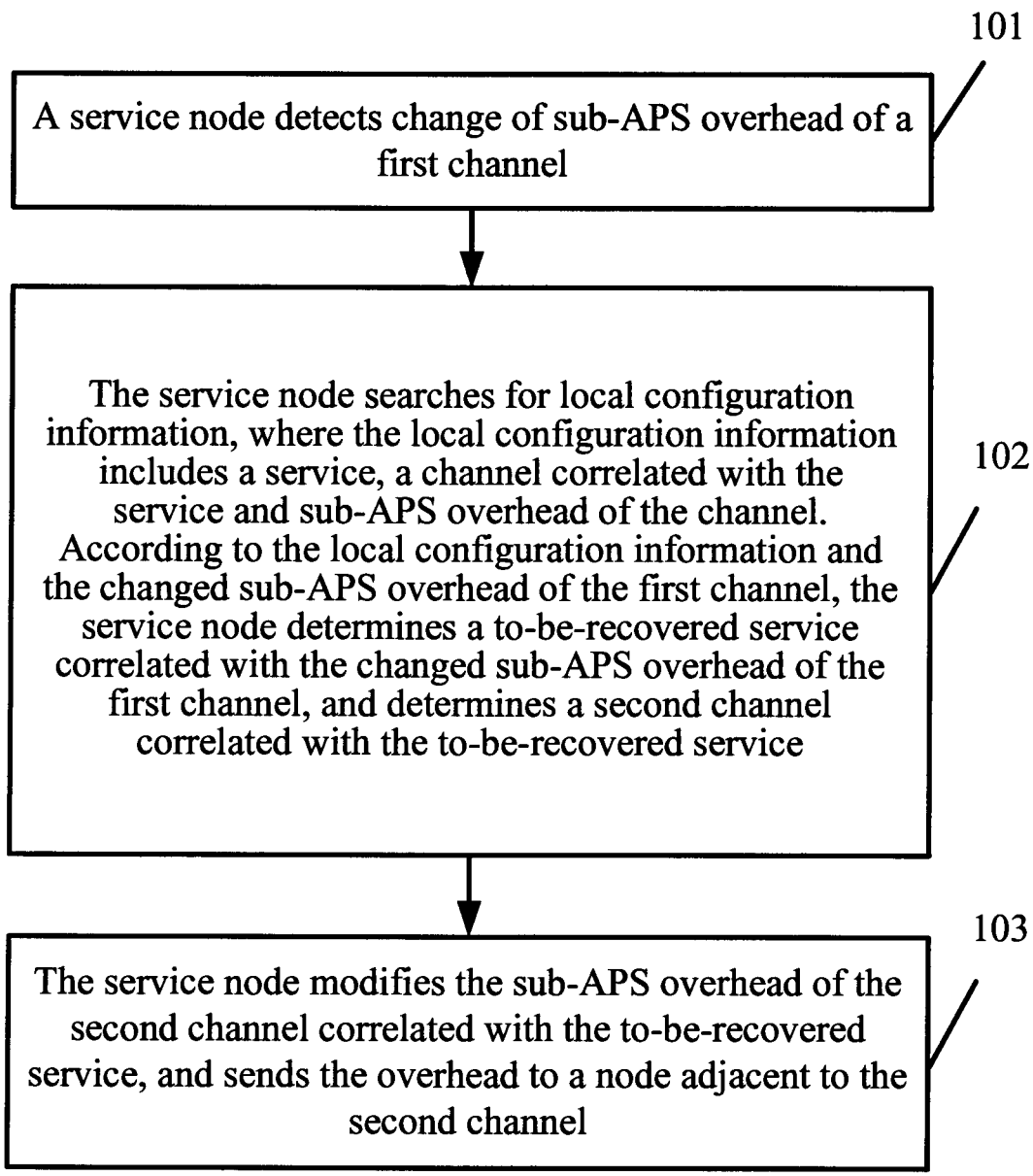
FIG. 1 is a flowchart of an information processing method in an optical network according to a first embodiment of the present invention.

The technical solutions in the embodiments of the present invention are described clearly and completely in the following with reference to the accompanying drawings in the embodiments of the present invention. Evidently, the embodiments to be described are merely some rather than all embodiments of the present invention. All other embodiments, which can be derived by those skilled in the art from the embodiments of the present invention without making any creative effort, shall fall within the protection scope of the present invention.

An embodiment of the present invention provides an information processing method in an optical network to reduce information processing complexity. Further, an embodiment of the present invention provides a corresponding optical communication apparatus and optical communication system. The following describes them in detail.

In the embodiment of the present invention, protection information needs to be configured on every node in a protection path, and protection information needs to be configured for one dimension on an end node of the protection path. End nodes are an initial node and a last node that provides protection for a service. For a bidirectional service, either of two end nodes is the initial node and is also the last node. An intermediate node is a node other than the end nodes in the protection path. Protection information needs to be configured for two dimensions on the intermediate nodes of the protection path.

In the embodiment of the present invention, it is required to configure overhead for each protection path. The overhead is used to transmit protection switching message of the protection path and protection path state message. The name of a message is only a symbol, and the message may have other names. The following description takes an OTN network and a Synchronous Digital Hierarchy (SDH, Synchronous Digital Hierarchy) network as an example. For an OTN network, a protection path may traverse one or more optical channel transport unit (OTU, Optical Channel Transport Unit) links, and each OTU link has corresponding OTU overhead and corresponding overhead of higher-order Optical Channel Data Unit (ODU, Optical Channel Data Unit). The specific overhead of the OUT of the OTU link or the higher-order ODU may be divided into N portions, and each portion may be configured for different protection paths for transmitting messages. For an SDH network, a protection path of a service traverses one or more Synchronous Transport Module (Synchronous Transport Module, STM)-N links, and each STM-N link can transmit a signal in an STM-N frame format. Each STM-N frame has corresponding section overhead. The section overhead includes regenerator section overhead and multiplex section overhead. The specific overhead of the STM-N link is divided into N portions, and each portion may be configured for different protection paths for transmitting messages.

For the OTN network, the OTU overhead and the higher-order ODU overhead are located in the overhead area of an OTU frame, and an overhead resource is exclusively available to each protection path. 1 RES byte in row 4 and column 9 in the overhead of an OTU frame transmitted in a certain OTU connection may be configured for transmitting a shared protection message, and two different portions of RES overhead are distinguished according to the value (0 or 1) of the lowest bit of MFAS overhead. That is, for an RES byte in row 4 and column 9, when the lowest bit of MFAS is 0, it represents one portion of overhead; when the lowest bit of the MFAS is 1, it represents another portion of overhead. In this way, the overhead for transmitting shared protection message in the OTU connection amounts to two RES bytes. The two RES bytes may be subdivided into 4 portions of overhead numbered 1-4. Each portion amounts to a half byte and can be used for transmitting the shared protection message of a certain service. According to the foregoing mode of dividing overhead, when the shared protection message of the service occupies a half byte, one OTU link can transmit 4 shared protection messages of different services. Alternatively, 4 APS bytes (bit 1 to bit 32, 32 bits in total) in row 4 and columns 5, 6, 7 and 8 in the overhead of an OTU frame transmitted in a certain OTU connection may be configured for transmitting shared protection messages, and 8 different portions of 4-byte APS overhead are distinguished according to the values (0-7) of the lowest 3 bits of MFAS overhead. In this way, the overhead for transmitting shared protection in the OTU connection amounts to 8×4=32 bytes. The 32 APS bytes may be subdivided into 64 portions of overhead numbered 1-64. Each portion amounts to a half byte (4 bits) and can be used for transmitting the shared protection message of a certain service. According to the foregoing mode of dividing overhead, when the shared protection message of the service occupies a half byte, one OTU link can transmit 64 shared protection messages of different services.

For the SDH network, the section overhead of STM-1 may be used to transmit a shared protection message and implement the shared protection function of a VC4 service. The section overhead is located in the overhead section of an STM-1 frame. The following description takes K1-byte overhead as an example, and other undefined overhead is also applicable. Alternatively, a K1 byte may be divided into two portions (overhead numbered 1 and 2), and each portion is available to one VC4 service.

In the embodiment of the present invention, a protection resource needs to be configured for the protection path. When the protection path recovers, it occupies the protection resource. At the end node of the protection path, it is only required to configure a protection resource for one dimension; at the intermediate node of the protection path, it is required to configure protection resources for two dimensions. For the OTN network, protection resources may be allocated in units of channels. When one protection path is recovered, it may occupy one channel. Protection resources may also be allocated in units of timeslots. When one protection path is recovered, it may occupy one or more timeslots. For the SDH network, protection resources may be allocated in units of VC4 timeslots, and one protection path occupies a VC4 timeslot.

In the embodiment of the present invention, the recovery of the protection path is implemented by the end node automatically, or may also be implemented in a manner that an administrator delivers a command to the end node to recover the protection path. That is, the recovery of the protection path may be implemented through automatic protection switching, or through manual protection switching. When a protection switching message is transmitted, the automatic protection switching and the manual protection switching can be distinguished according to the overhead of a certain number.

FIG. 1 is a flowchart of an information processing method in an optical network according to a first embodiment of the present invention. The method includes the following steps:

Step 101: A service node detects that sub-automatic protection switching sub-APS overhead of a first channel changes.

Step 102: The service node searches for local configuration information, where the local configuration information includes a service, a channel correlated with the service, and sub-APS overhead of the channel; and according to the local configuration information and the changed sub-APS overhead of the first channel, determines a to-be-recovered service correlated with the changed sub-APS overhead of the first channel, and determines a second channel correlated with the to-be-recovered service.

Step 103: The service node modifies sub-APS overhead of the second channel correlated with the to-be-recovered service, and sends the overhead to a node adjacent to the second channel.

The determining the to-be-recovered service correlated with the changed sub-APS overhead of the first channel according to the local configuration information and the changed sub-APS overhead of the first channel includes:

in the local configuration information, matching the changed sub-APS overhead of the first channel with the first channel correlated with the service and sub-APS overhead corresponding to the first channel to determine a corresponding to-be-recovered service.

The sub-APS overhead is one of at least two portions that are generated by dividing the APS overhead of the channel. Different sub-APS overhead corresponds to recovery information of different services.

The APS overhead of the channel is APS overhead of a single frame, or is APS overhead of a multiframe formed by at least two frames.

After the determining the second channel correlated with the to-be-recovered service, the method further includes: setting up a cross-connection between the second channel and the first channel that are correlated with the to-be-recovered service for the to-be-recovered service.

Before the setting up the cross-connection between the second channel and the first channel that are correlated with the to-be-recovered service for the to-be-recovered service, the method further includes: detecting that the sub-APS overhead of the second channel changes.

The setting up the cross-connection between the second channel and the first channel that are correlated with the to-be-recovered service for the to-be-recovered service is executed according to the detected change of the sub-APS overhead of the first channel and the second channel.

The detecting that the sub-APS overhead of the first channel changes includes: determining, according to a result of comparison between the received sub-APS overhead of the first channel and the stored sub-APS overhead of the first channel, that the sub-APS overhead of the first channel changes.

The detecting that the sub-APS overhead of the second channel changes includes: determining, according to a result of comparison between the received sub-APS overhead of the second channel and the stored sub-APS overhead of the second channel, that the sub-APS overhead of the second channel changes.

The content of the first embodiment reveals that, in the technical solutions of the embodiment of the present invention, the local configuration information can be searched for after it is detected that the sub-APS overhead of the first channel changes, where the local configuration information includes the service, the channel correlated with the service, and the sub-APS overhead of the channel; according to the local configuration information and the changed sub-APS overhead of the first channel, the to-be-recovered service correlated with the changed sub-APS overhead of the first channel can be determined, and the second channel correlated with the to-be-recovered service can be determined. In this embodiment, the service node is an intermediate node between an initial node and a last node of the to-be-recovered service. Therefore, the sub-APS overhead of the second channel correlated with the to-be-recovered service can be notified and sent to the node adjacent to the second channel, so as to instruct the adjacent node to request service recovery. Because sub-APS overhead is sent through a data plane to indicate recovery information, a signaling protocol is generally simple; moreover, local configuration information is set locally, and can be used for searching for relevant information. In this way, the recovery information can be obtained simply and information processing complexity is reduced.

Figure 2:
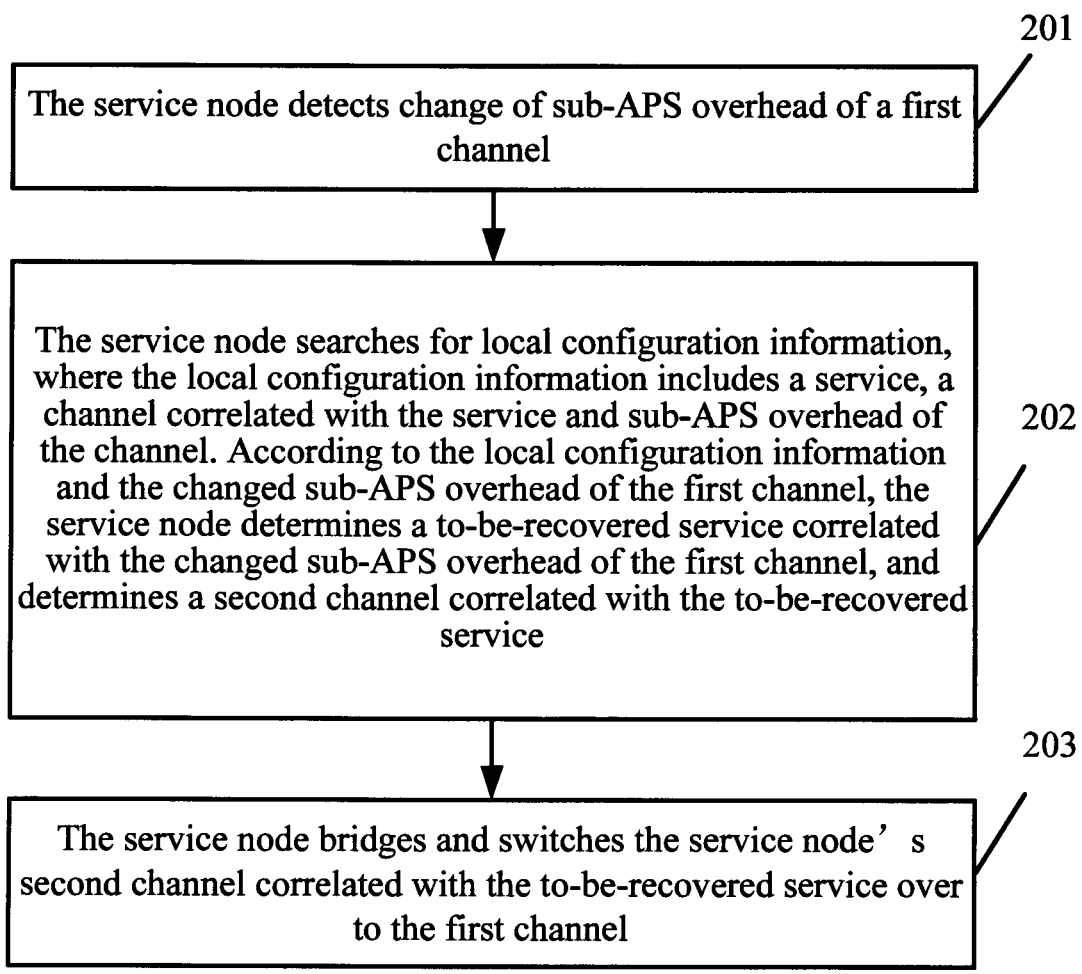
FIG. 2 is a flowchart of an information processing method in an optical network according to a second embodiment of the present invention.

FIG. 2 is a flowchart of an information processing method in an optical network according to a second embodiment of the present invention. The method mainly includes the following steps:

Step 201: A service node detects that sub-APS overhead of a first channel changes.

Step 202: The service node searches for local configuration information, where the local configuration information includes a service, a channel correlated with the service, and sub-APS overhead of the channel; according to the local configuration information and the changed sub-APS overhead of the first channel, determines a to-be-recovered service correlated with the changed sub-APS overhead of the first channel, and determines a second channel correlated with the to-be-recovered service.

Step 203: The service node bridges and switches the service node's second channel correlated with the to-be-recovered service over to the first channel.

The determining the to-be-recovered service correlated with the changed sub-APS overhead of the first channel according to the local configuration information and the changed sub-APS overhead of the first channel includes:

in the local configuration information, matching the changed sub-APS overhead of the first channel with the first channel correlated with the service and sub-APS overhead corresponding to the first channel, and determining a corresponding to-be-recovered service.

The content of the second embodiment reveals that, in the technical solutions of the present invention, the local configuration information can be searched for after it is detected that the sub-automatic protection switching sub-APS overhead of the first channel changes, where the local configuration information includes the service, the channel correlated with the service, and the sub-APS overhead of the channel; according to the local configuration information and the changed sub-APS overhead of the first channel, the to-be-recovered service correlated with the changed sub-APS overhead of the first channel can be determined, and the second channel correlated with the to-be-recovered service can be determined. In the embodiment, the service node is the last node of the to-be-recovered service. Therefore, the service node's second channel correlated with the to-be-recovered service can be bridged and switched to the first channel, to recover the service. Because sub-APS overhead is sent through a data plane to indicate recovery information, a signaling protocol is generally simple; moreover, local configuration information is set locally and can be used for searching for relevant information. In this way, the recovery information can be obtained simply, and information processing complexity is reduced.

Figure 3:
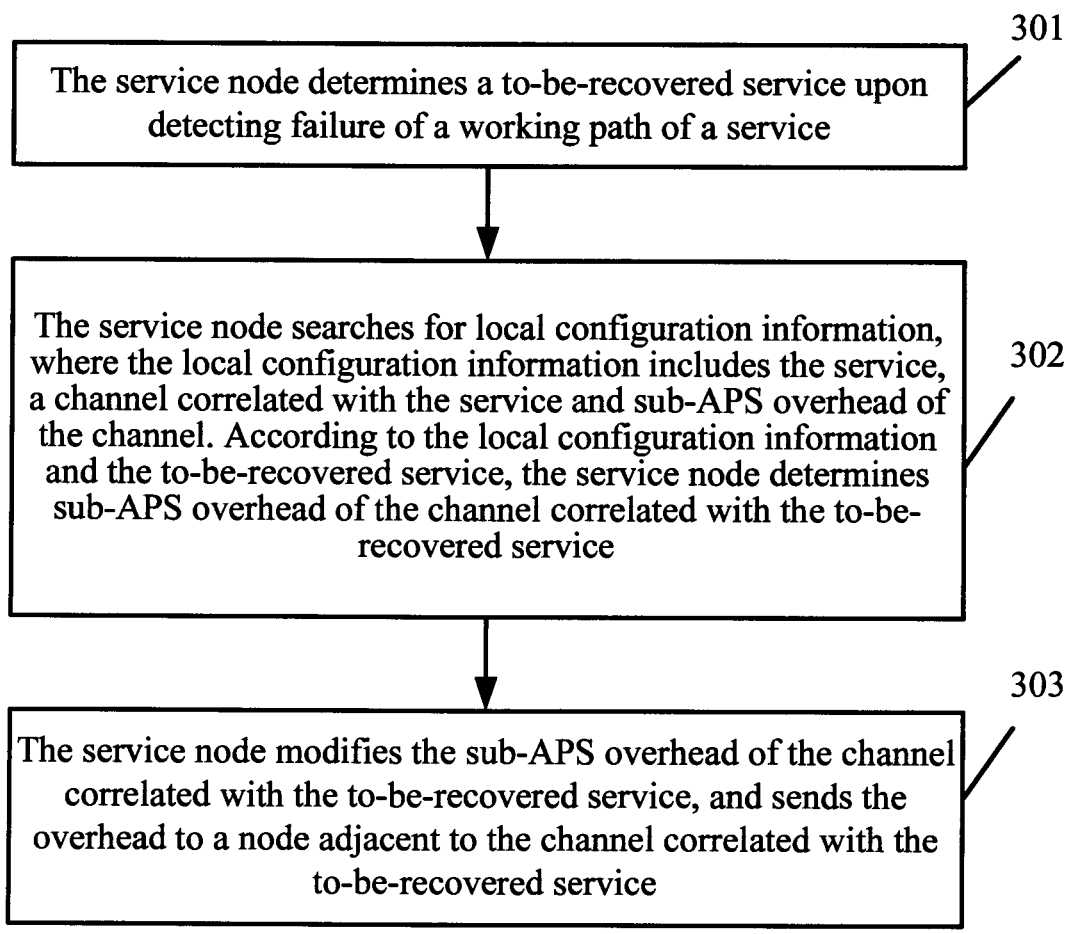
FIG. 3 is a flowchart of an information processing method in an optical network according to a third embodiment of the present invention.

FIG. 3 is a flowchart of an information processing method in an optical network according to a third embodiment of the present invention. The method mainly includes the following steps:

Step 301: A service node determines a to-be-recovered service upon detecting that a working path of a service fails.

Step 302: The service node searches for local configuration information, where the local configuration information includes the service, a channel correlated with the service, and sub-automatic protection switching sub-APS overhead of the channel; according to the local configuration information and the to-be-recovered service, determines the sub-APS overhead of a channel correlated with the to-be-recovered service.

Step 303: The service node modifies the sub-APS overhead of the channel correlated with the to-be-recovered service, and sends the overhead to a node adjacent to the channel correlated with the to-be-recovered service.

The determining the sub-APS overhead of the channel correlated with the to-be-recovered service according to the local configuration information and the to-be-recovered service includes: in the local configuration information, matching the determined to-be-recovered service with the service, the channel correlated with the service, and the sub-APS overhead of the channel, and determining the sub-APS overhead of the channel correlated with the to-be-recovered service.

The content of the foregoing embodiment reveals that: The service node is the initial node of the to-be-recovered service, and therefore, the to-be-recovered service can be determined after it is detected that the working path of the service fails; the service node can search for the local configuration information after detecting that the sub-automatic protection switching sub-APS overhead of the first channel changes, where the local configuration information includes the service, the channel correlated with the service, and the sub-APS overhead of the channel; according to the local configuration information and the changed sub-APS overhead of the first channel, the service node can determine the to-be-recovered service correlated with the changed sub-APS overhead of the first channel, and then modify the sub-APS overhead of the channel correlated with the to-be-recovered service and send the overhead to the node adjacent to the channel correlated with the to-be-recovered service, so as to instruct the adjacent node to request service recovery. Because sub-APS overhead is sent through a data plane to indicate recovery information, a signaling protocol is generally simple; moreover, local configuration information is set locally and can be used for searching for relevant information. In this way, the recovery information can be obtained simply and information processing complexity is reduced.

The following describes the embodiment of the present invention in further detail with reference to a fourth embodiment and a fifth embodiment. The "information" referred in the embodiment of the present invention may be shared Mesh recovery information. In the following content, the shared Mesh recovery information is taken as an example for illustration. The shared Mesh recovery information is expressed by overhead.

Figure 4:
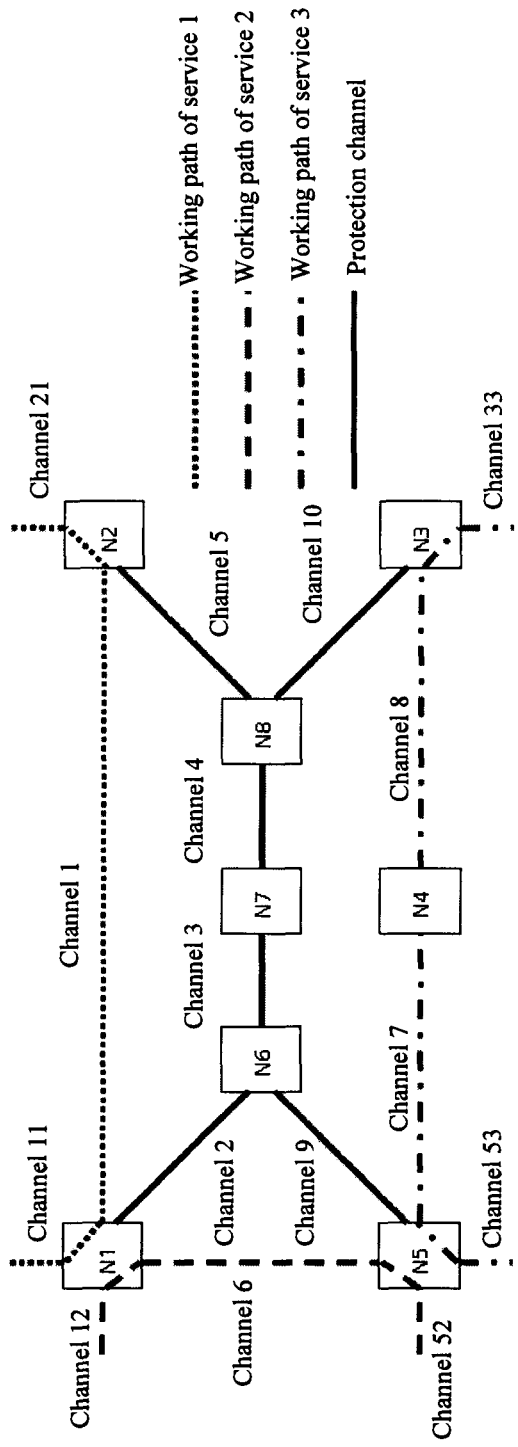
FIG. 4 is a schematic diagram of a network architecture according to a fourth embodiment and a fifth embodiment of the present invention.

FIG. 4 is a schematic diagram of a network architecture according to a fourth embodiment and a fifth embodiment of the present invention.

In FIG. 4, node N1 to node N8 are included. ODUk channels (for ease of description later, briefly called "channel") exist between the nodes. Each channel is numbered in the figure, for example, channel 11, and channel 12. In FIG. 4, three ODUk shared mesh services are configured, which are called service 1, service 2, and service 3. For each node, each service generally has two channels, called a first channel and a second channel. For example, a first channel of service 1 of node N1 is channel 11, a second channel is channel 2; a first channel of service 2 of node N1 is channel 12, and a second channel is channel 2; channel 2 is a channel that can be shared by service 1 and service 2.

Figure 5:
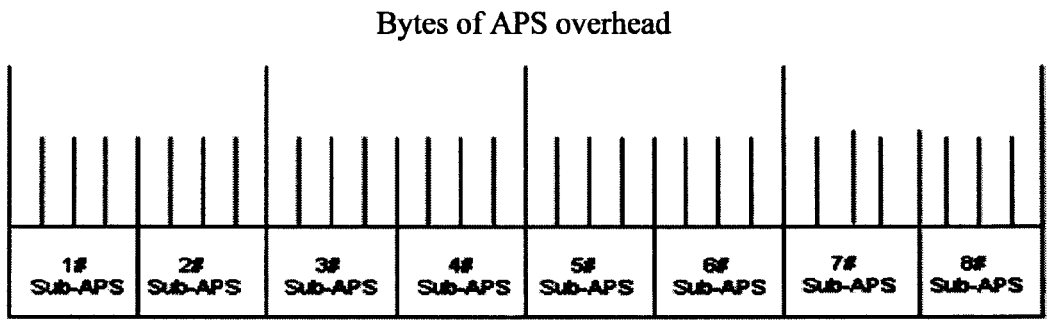
FIG. 5 is a schematic structural diagram of protection switching overhead according to a fourth embodiment and a fifth embodiment of the present invention.

FIG. 5 is a schematic structural diagram of protection switching overhead according to a fourth embodiment and a fifth embodiment of the present invention.

In the embodiment of the present invention, protection switching overhead in an ODUk channel is sent to indicate shared Mesh recovery information. For the protection switching overhead in the embodiment of the present invention, APS overhead is taken as an example for illustration.

The APS overhead has 4 bytes in total. Because the same ODUk channel can be shared by multiple services, messages of different services are required to be distinguished in the APS overhead.

As shown in FIG. 5, 4-byte APS overhead is divided into 8 portions (8 Sub-APS overhead), which are marked 1# Sub-APS to 8# Sub-APS. Each portion of overhead amounts to 4 bits, and may have one of 16 values ranging from 0 to 15. Each value may correspond to 1 type of shared Mesh recovery information. At most 16 types of shared Mesh recovery information can be defined.

It should be noted that the example above is illustrative only, and the APS overhead is not necessarily divided into 8 portions. If shared Mesh recovery information has many types (more than 16 types), the APS overhead may be divided into 6 portions (each portion amounts to 5 bits, and may have one of 32 values), or divided into 5 portions (each portion amounts to 6 bits, and may have one of 64 values), or divided into other portions.

Besides, configuration information is preset on each node traversed by a protection path in a network. That is, local configuration information includes the occupation state of Sub-APS overhead, namely, the user of each portion of Sub-APS overhead is configured. For details, refer to Table 1 to Table 7 below. In the following tables, a first channel is relative to a second channel.

TABLE 1

| N1 configuration information | First channel | Sub-APS overhead of the first channel | Second channel | Sub-APS overhead of the second channel |
| --- | --- | --- | --- | --- |
| Service 1 | 11 | NULL (null) | 2 | 1#Sub-APS |
| Service 2 | 12 | NULL (null) | 2 | 2#Sub-APS |

TABLE 2

| N6 configuration information | First channel | Sub-APS overhead of the first channel | Second channel | Sub-APS overhead of the second channel |
| --- | --- | --- | --- | --- |
| Service 1 | 2 | 1#Sub-APS | 3 | 1#Sub-APS |
| Service 2 | 2 | 2#Sub-APS | 9 | 1#Sub-APS |
| Service 3 | 3 | 2#Sub-APS | 9 | 2#Sub-APS |

TABLE 3

| N5 configuration information | First channel | Sub-APS overhead of the first channel | Second channel | Sub-APS overhead of the second channel |
| --- | --- | --- | --- | --- |
| Service 2 | 52 | NULL (null) | 9 | 1#Sub-APS |
| Service 3 | 53 | NULL (null) | 9 | 2#Sub-APS |

TABLE 4

| N7 configuration information | First channel | Sub-APS overhead of the first channel | Second channel | Sub-APS overhead of the second channel |
| --- | --- | --- | --- | --- |
| Service 1 | 3 | 1#Sub-APS | 4 | 1#Sub-APS |
| Service 3 | 3 | 2#Sub-APS | 4 | 2#Sub-APS |

TABLE 5

| N8 configuration information | First channel | Sub-APS overhead of the first channel | Second channel | Sub-APS overhead of the second channel |
| --- | --- | --- | --- | --- |
| Service 1 | 4 | 1#Sub-APS | 5 | 1#Sub-APS |
| Service 3 | 4 | 2#Sub-APS | 10 | 1#Sub-APS |

TABLE 6

| N2 configuration information | First channel | Sub-APS overhead of the first channel | Second channel | Sub-APS overhead of the second channel |
| --- | --- | --- | --- | --- |
| Service 1 | 21 | NULL (null) | 5 | 1#Sub-APS |

TABLE 7

| N3 configuration information | First channel | Sub-APS overhead of the first channel | Second channel | Sub-APS overhead of the second channel |
| --- | --- | --- | --- | --- |
| Service 3 | 33 | NULL (null) | 10 | 1#Sub-APS |

As shown in each table above, Sub-APS overhead used by three services is configured on nodes N1, N6, N5, N7, N8, N2, and N3. If no Sub-APS overhead is configured, the overhead is marked as NULL (null) in the table.

Taking the configuration information in Table 2 as an example, the first channel of service 1 configured on the node N6 is channel 2, the second channel is channel 3 (relatively, if channel 2 serves as the second channel, channel 3 is the first channel), the first channel uses the 1# Sub-APS generated by dividing APS overhead, and the second channel also uses 1# Sub-APS; the first channel of service 2 is channel 2, the second channel is channel 9, the first channel uses the 2# Sub-APS generated by dividing the APS overhead, and the second channel uses 1# Sub-APS; the first channel of service 3 is channel 3, the second channel is channel 9, the first channel uses the 2# Sub-APS generated by dividing the APS overhead, and the second channel uses 2# Sub-APS. It can be seen that, service 1 and service 2 can share channel 2, and service 2 and service 3 can share channel 9.

Besides, for a certain node, if it is detected from the first channel that the sub-APS overhead changes, the first channel in the table represents "a previous channel", and the second channel in the table represents "a next channel"; if it is detected from the second channel that the sub-APS overhead changes, the second channel in the table represents "a previous channel", and the first channel in the table represents "a next channel".

Meanwhile, through the configuration of the sub-APS overhead in the table, whether a corresponding node is an end point of a service can be learned. That is, when the sub-APS overhead of the first channel or the sub-APS overhead of the second channel is NULL, it indicates that the node is an end point of the service. For service 1, N1 and N2 are end points of the service; for service 2, N1 and N5 are end points of the service; for service 3, N5 and N3 are end points of the service. Each service has two end points of the service. Therefore, when a working path fails, the failure may be detected at both of the two end points of the service, which may trigger a processing procedure of the embodiment of the present invention. In the following content, the processing procedure in one direction is described as an example, and the processing procedure in another direction is similar.

Sub-APS overhead sent on a protection path may indicate the following information: (1) When a working path is normal, the value of the sub-APS overhead is 0; (2) when a working path fails, the value of the sub-APS overhead is 1, namely, service recovery is requested. That is, when the working path is normal, the value of the sub-APS overhead value of the protection path corresponding to the service is 0; when the working path fails, the value of the sub-APS overhead value of the protection path corresponding to the service is 1. Therefore, when the working path changes from normal to failure, the value of the sub-APS overhead value of the corresponding protection path also changes (from 0 to 1). Definitely, a contrary value may be defined. A protection path may be formed by one or more channels.

Definitely, the meaning of other values of the sub-APS overhead may be defined. For example, the value of the sub-APS overhead is defined as "3", indicating that the protection path fails; the value of the sub-APS overhead is "4", indicating that the protection path is normal; so that the end point of the service maintains the state of the protection path. In this case, when both the working path and the protection path are normal, the value of the sub-APS overhead sent by the protection path is 4.

The following describes the technical solutions of the present invention by taking only two cases that the value of the sub-APS is defined to 0 (the working path is normal) and to 1 (the working path fails, namely, service recovery is requested) as an example. If another value such as 2 is defined, when the value of the sub-APS changes from 2 to 1, it also indicates that the working path of a corresponding service fails, and recovery is requested.

When the working path is normal, the value of the sub-APS overhead of the channel corresponding to the service is 0.

When detecting the failure of the working path, the end point of the service modifies the value of the sub-APS overhead of the channel corresponding to the service from 0 to 1 according to the local configuration information, and a next node can detect the change.

The next node can detect that the APS overhead sent by a previous channel changes, further determine the serial number of the changed sub-APS, and determine a service corresponding to the serial number according to the serial number of the changed sub-APS. Moreover, when the value of the sub-APS changes from 0 to 1, it indicates that service recovery is requested. Further, it is judged whether the node is an end point of the service. If the node is not the end point of the service, the value of the sub-APS in the sending direction of a next channel corresponding to the service is modified to 1, to indicate a request for recovering the service. In this way, the next node can also detect the service recovery request and notify a next node of the service recovery request.

Other nodes repeat the foregoing process until the service arrives at the end point of the service. The end point of the service executes recovery, and performs bridging and switching between channels, without notifying a next node of the service recovery request.

Figure 6:
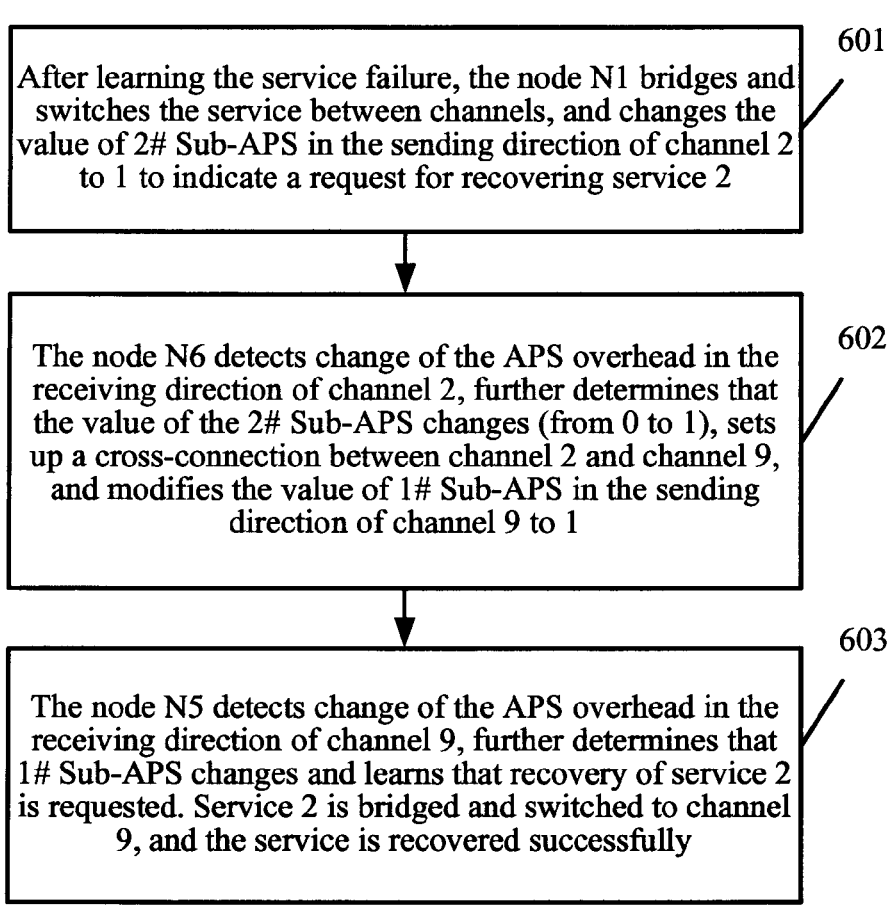
FIG. 6 is a flowchart of an information processing method in an optical network according to a fourth embodiment of the present invention.

FIG. 6 is a flowchart of an information processing method in an optical network according to a fourth embodiment of the present invention. The method mainly includes the following steps:

Step 601: After learning the service failure, node N1 performs bridging and switching between channels, and modifies the value of 2# Sub-APS in the sending direction of channel 2 to 1 to indicate a request for recovering service 2.

When the working path of service 2 fails, N1 detects that service 2 fails, searches for Table 1, determines that the channel of the protection path of service 2 is channel 2 according to the configuration information of N1, bridges and switches service 2 from channel 6 to channel 2 (the signal of channel 12 is transmitted to both channel 6 and channel 2, and is received at channel 2 selectively), and determines that service 2 uses the 2# Sub-APS of channel 2 to transmit recovery information. Therefore, the value of the 2# Sub-APS in the sending direction of channel 2 is modified to 1, namely, 4 bits are binary 0001, indicating a request for recovering service 2.

Step 602: Node N6 detects that the APS overhead in the receiving direction of channel 2 changes, and further determines that the value of the 2# Sub-APS changes (the value changes from 0 to 1). Therefore, a cross-connection between channel 2 and channel 9 is set up, and modifies the value of 1# Sub-APS in the sending direction of channel 9 to 1.

N6 detects that the APS overhead of channel 2 changes, compares the overhead with previously stored APS overhead, and fords that the value of the 2# Sub-APS changes (the value changes from 0 to 1). N6 searches the configuration information in Table 2. Because a receiving channel is channel 2 and protection switching overhead is 2# Sub-APS, N6 matches a service with a channel correlated with a to-be-recovered service and the sub-APS overhead of the channel in Table 2, and can search out that service 2 meets the matching condition, and learns that recovery of service 2 is requested.

After learning that the recovery of service 2 is requested, N6 sets up a cross-connection from the first channel of service 2 to the second channel of service 2 (namely, channel 2 is in cross-connection to channel 9) according to the first channel of service 2 in the configuration information being 2 and the second channel being channel 9.

It is determined that channel 9 uses 1# Sub-APS. The value of 1# Sub-APS may be 1, namely, 4 bits are binary 0001. The value of 1# Sub-APS in the sending direction of channel 9 is modified to 1 to indicate a request for recovering service 2.

Step 603: Node N5 detects that the APS overhead in the receiving direction of channel 9 changes, further determines that the 1# Sub-APS changes, and learns that recovery of service 2 is requested. Because N5 is an end point of service 2, N5 bridges and switches service 2 to channel 9, and the service is recovered successfully.

N5 detects that the APS overhead of channel 9 changes, compares the overhead with previously stored APS overhead, and finds that the value of the 1# Sub-APS changes (from 0 to 1). N5 searches the configuration information in Table 3. Because a receiving channel is channel 9 and protection switching overhead is 1# Sub-APS, N5 can search out that service 2 in Table 3 meets the matching condition, and N5 learns that recovery of service 2 is requested and N5 is an end point of service 2.

After learning that the recovery of service 2 is requested, N5 bridges and switches service 2 from channel 52 to channel 9 (a signal is transmitted from channel 52 to both channel 6 and channel 9, and is received at channel 9 selectively)

according to the first channel of service 2 in the configuration information being channel 52 and the second channel being channel 9. In this case, service 2 is recovered successfully.

The embodiment reveals that the technical solutions of the present invention use the APS overhead of an ODUk channel to indicate the recovery information, then a service required to be recovered can be learned by using the APS overhead to search for preconfigured information, and a relevant recovery operation is performed. Because sub-APS overhead is sent through a data plane to indicate recovery information, a signaling protocol is generally simple; moreover, local configuration information is set locally, and can be used for searching for relevant information. In this way, the recovery information can be obtained simply, corresponding processing is even simpler, and a control plane does not need to participate in a recovery process. Moreover, the APS overhead may be divided into different portions according to specific conditions, namely, divided into different Sub-APS, to correspond to recovery information of different shared Mesh services. In this way, the recovery information of more shared Mesh services can be distinguished to meet requirements in different scenarios.

It should be noted that the foregoing description takes APS overhead of one frame as an example, which shall not be construed as a limitation. A multiframe technology may also be applied, and APS overhead of N continuous data frames is combine into an entirety. That is, the APS overhead of one ODUk channel is N×4 bytes. Therefore, the overhead of the entirety may also be used as one APS overhead, and the N×4 bytes may be divided into multiple portions of Sub-APS overhead based on the same principle. In this case, each portion of Sub-APS may have more bits, and recovery information of more types of shared Mesh services can be defined.

Figure 7:
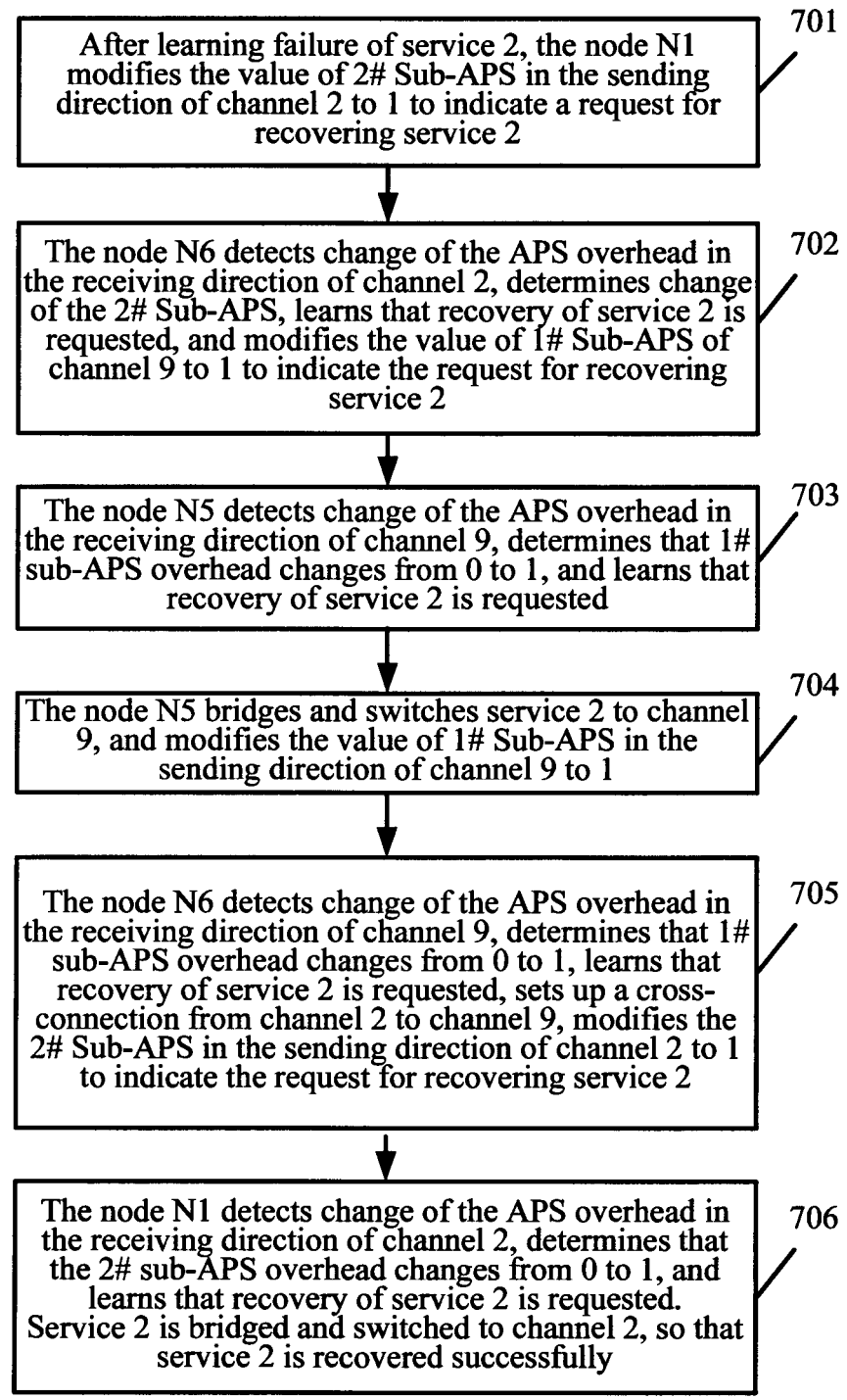
FIG. 7 is a flowchart of an information processing method in an optical network according to a fifth embodiment of the present invention.

FIG. 7 is a flowchart of an information processing method in an optical network according to a fifth embodiment of the present invention. The fifth embodiment differs from the fourth embodiment in that: The node does not perform the switching until the node detects that Sub-APS overhead in two directions changes to 1.

As shown in FIG. 7, the method mainly includes the following steps:

Step 701: After learning failure of service 2, node N1 modifies the value of 2# Sub-APS in the sending direction of channel 2 to 1 to indicate a request for recovering service 2.

When the working path of service 2 fails, N1 detects the failure of service 2, searches Table 1, determines that the channel of the protection path of service 2 is channel 2 according to the configuration information of N1, and modifies the value of 2# Sub-APS in the sending direction of channel 2 to 1 to indicate the request for recovering service 2.

Step 702: Node N6 detects that APS overhead in the receiving direction of channel 2 changes, further determines that the 2# Sub-APS changes, and learns that recovery of service 2 is requested. Therefore, N6 modifies the value of 1# Sub-APS of channel 9 to 1 to indicate the request for recovering service 2.

N6 detects that the APS overhead in the receiving direction of channel 2 changes, compares the overhead with previously stored APS, and further finds that the value of the 2# sub-APS changes from 0 to 1. N6 searches configuration information in Table 2. Because a receiving channel is channel 2 and protection switching overhead is 2# Sub-APS, N6 matches a service with a channel correlated with a to-be-recovered service and the sub-APS overhead of the channel in Table 2, N6 can search out that service 2 meets the matching condition, and learns that recovery of service 2 is requested.

After learning that the recovery of service 2 is requested, N6 determines that N6 is an intermediate node of service 2 and a next channel is channel 9, N6 configures and uses 1# Sub-APS. Therefore, N6 modifies the value of the 1# sub-APS of channel 9 to 1, indicating that the recovery of service 2 is requested.

Step 703: Node N5 detects that APS overhead in the receiving direction of channel 9 changes, further determines that the 1# sub-APS overhead changes from 0 to 1, and learns that the recovery of service 2 is requested.

N5 detects that the APS overhead of channel 9 changes, compares the overhead with previously stored APS overhead, and further determines that the value of the 1# sub-APS overhead changes from 0 to 1. N5 searches the configuration information in Table 3. Because a receiving channel is channel 9 and protection switching overhead is 1# Sub-APS, N5 can search out that service 2 in Table 3 meets the matching condition, and learns that the recovery of service 2 is requested and that N1 is an end point of service 2.

Step 704: The node N5 bridges and switches service 2 to channel 9, and modifies the value of 1# Sub-APS in the sending direction of channel 9 to 1.

After learning that the recovery of service 2 is requested, the node N5 bridges and switches service 2 from channel 52 to channel 9 (a signal is transmitted from channel 52 to both channel 6 and channel 9, and is received at channel 9 selectively) according to the first channel of service 2 in the configuration information being channel 52 and the second channel being channel 9. Besides, N5 modifies the value of the 1# Sub-APS in the sending direction of channel 9 to 1, indicating a request for recovering service 2.

Step 705: The node N6 detects that APS overhead in the receiving direction of channel 9 changes, further determines that the 1# sub-APS overhead changes from 0 to 1, and learns that recovery of service 2 is requested. In this case, N6 receives recovery request information of the service 2 from both channel 2 and channel 9, and therefore, N6 sets up a cross-connection from channel 2 to channel 9, and modifies the 2# Sub-APS in the sending direction of channel 2 to 1, indicating the request for recovering service 2.

Step 706: Node N1 detects that APS overhead in the receiving direction of channel 2 changes, further determines that the 2# sub-APS overhead changes from 0 to 1, and learns that recovery of service 2 is requested. N1 bridges and switches service 2 to channel 2, and service 2 is recovered successfully.

The node N1 detects that the APS overhead of channel 2 changes, compares the overhead with previously stored APS overhead of channel 2, and further determines that the 2# sub-APS overhead changes from 0 to 1. That is, N1 receives, from channel 2, a request message for recovering service 2. N1 receives the recovery request of service 2 from channel 2, and therefore, bridges and switches service 2 to channel 2 (a signal is transmitted from channel 12 to both channel 6 and channel 2, and is received at channel 2 selectively). In this case, service 2 is recovered successfully.

It should be noted that in the foregoing embodiment, judging whether the APS overhead changes may be: detecting whether the APS overhead content of N continuous frames of ODU keeps consistent, and comparing whether the APS overhead content is different from the content of latest stable APS overhead. N may be 1, 2, or 3.

As for detecting whether 4-byte APS overhead changes, entire 4-byte APS overhead is received, it is required to compare the received APS overhead with the content of stored 4-byte APS overhead that is received previously, and corresponding changed sub-APS overhead is further determined;

if the sub-APS overhead is compared, the serial number of the changed sub-APS can be obtained directly.

The embodiment also uses the APS overhead of an ODUk channel to indicate the recovery information, then a service required to be recovered can be learned by using the APS overhead to search for preconfigured information, and a relevant recovery operation is performed. Because sub-APS overhead is sent through a data plane to indicate recovery information, a signaling protocol is generally simple; moreover, local configuration information is set locally and can be used for searching for relevant information. In this way, the recovery information is obtained simply, corresponding processing is even simpler, and a control plane does not need to participate in a recovery process.

The fifth embodiment differs from the fourth embodiment in that: An intermediate node does not set up a cross-connection between channels until it receives a service recovery request indication from two directions; the end point of a service does not perform bridging and switching between channels until an initial node sends a service recovery request indication to a downstream node according to the detected failure of a working path and receives the service recovery request indication returned by the downstream node, and therefore, service recovery is performed more accurately.

The content above gives details about an information processing method in an optical network in an embodiment of the present invention. Accordingly, an embodiment of the present invention provides an optical communication apparatus and an optical communication system.

Figure 8:
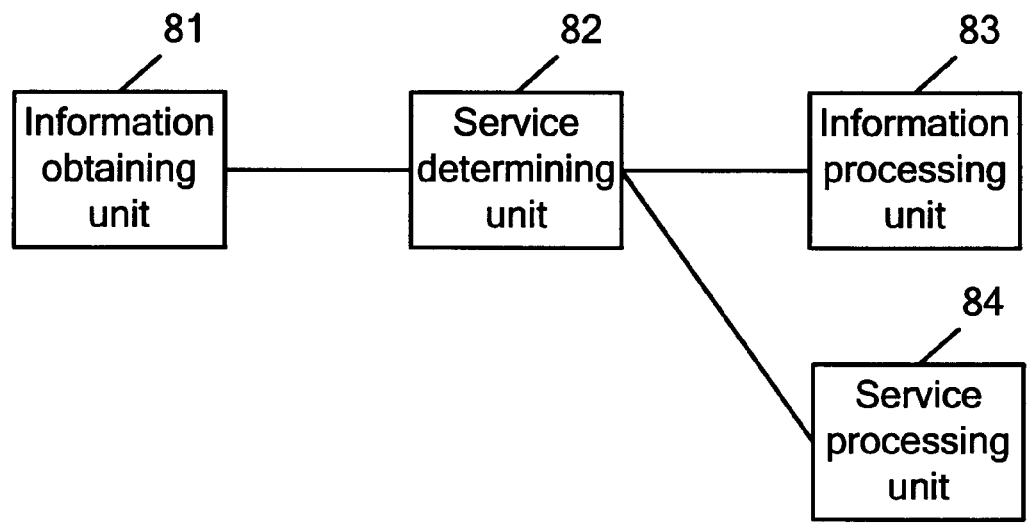
FIG. 8 is a schematic diagram of a first structure of an optical communication apparatus according to an embodiment of the present invention.

FIG. 8 is a schematic diagram of a first structure of an optical communication apparatus according to an embodiment of the present invention.

As shown in FIG. 8, the optical communication apparatus includes:

an information obtaining unit 81, configured to detect that sub-automatic protection switching sub-APS overhead of a first channel changes;

a service determining unit 82, configured to: search for local configuration information, where the local configuration information includes a service, a channel correlated with the service, and sub-APS overhead of the channel; according to the local configuration information and the changed sub-APS overhead of the first channel, determine a to-be-recovered service correlated with the changed sub-APS overhead of the first channel, and determine a second channel correlated with the to-be-recovered service; and an information processing unit 83, configured to modify the sub-APS overhead of the second channel correlated with the to-be-recovered service, and send the overhead to an optical communication apparatus adjacent to the second channel.

The optical communication apparatus may further include:

a service processing unit 84, configured to set up a cross-connection between the second channel and the first channel correlated with the to-be-recovered service for the to-be-recovered service after the service determining unit 82 determines the second channel correlated with the to-be-recovered service.

The information obtaining unit 81 is further configured to detect that the sub-APS overhead of the second channel changes; and the service processing unit 84 is further configured to set up the cross-connection between the second channel and the first channel correlated with the to-be-recovered service for the to-be-recovered service according to the detected change of the sub-APS overhead of the first channel and the second channel.

The service determining unit 82 determining the to-be-recovered service correlated with the changed sub-APS overhead of the first channel according to the local configuration information and the changed sub-APS overhead of the first channel, includes:

in the local configuration information, matching the changed sub-APS overhead of the first channel with the first channel correlated with the service and sub-APS overhead corresponding to the first channel, and determining a corresponding to-be-recovered service.

The detecting that the sub-APS overhead of the first channel changes includes: determining, according to a result of comparison between the received sub-APS overhead of the first channel and the stored sub-APS overhead of the first channel, that the sub-APS overhead of the first channel changes.

The detecting that the sub-APS overhead of the second channel changes includes: determining, according to a result of comparison between the received sub-APS overhead of the second channel and the stored sub-APS overhead of the second channel, that the sub-APS overhead of the second channel changes.

The sub-APS overhead is one of at least two portions that are generated by dividing the APS overhead of the channel. Different sub-APS overhead corresponds to recovery information of different services. The APS overhead of the channel is APS overhead of a single frame, or is APS overhead of a multiframe formed by at least two frames.

Figure 9:
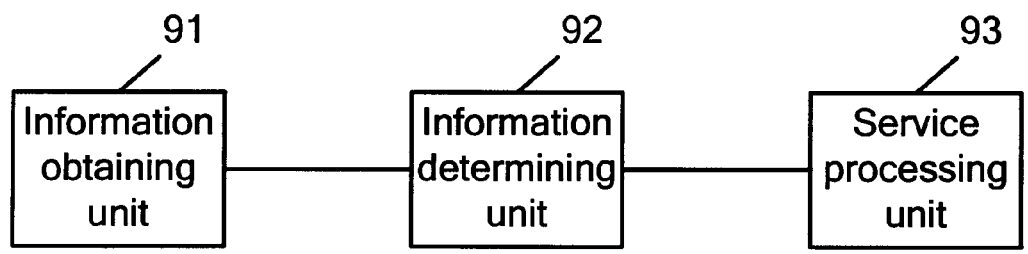
FIG. 9 is a schematic diagram of a second structure of an optical communication apparatus according to an embodiment of the present invention.

FIG. 9 is a schematic diagram of a second structure of an optical communication apparatus according to an embodiment of the present invention.

As shown in FIG. 9, the optical communication apparatus includes:

an information obtaining unit 91, configured to detect that sub-automatic protection switching sub-APS overhead of a first channel changes;

a service determining unit 92, configured to: search for local configuration information, where the local configuration information includes a service, a channel correlated with the service, and sub-APS overhead of the channel; according to the local configuration information and the changed sub-APS overhead of the first channel, determine a to-be-recovered service correlated with the changed sub-APS overhead of the first channel, and determine a second channel correlated with the to-be-recovered service; and a service processing unit 93, configured to bridge and switch the second channel of the optical communication apparatus to the first channel, where the second channel is correlated with the to-be-recovered service.

The service determining unit 92 determining the to-be-recovered service correlated with the changed sub-APS overhead of the first channel according to the local configuration information and the changed sub-APS overhead of the first channel, includes:

in the local configuration information, matching the changed sub-APS overhead of the first channel with the first channel correlated with the service and sub-APS overhead corresponding to the first channel, and determining a corresponding to-be-recovered service.

Figure 10:
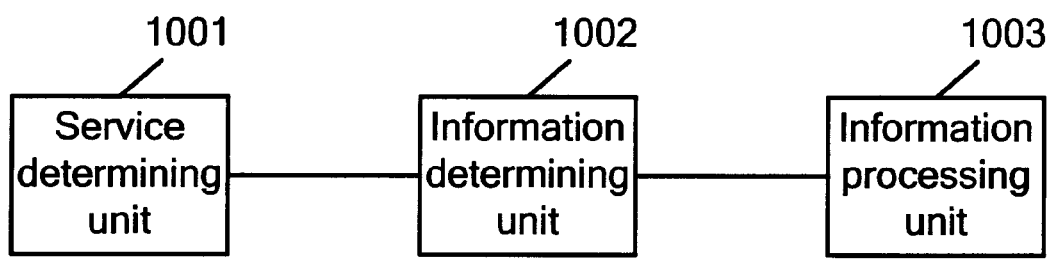
FIG. 10 is a schematic diagram of a third structure of an optical communication apparatus according to an embodiment of the present invention.

FIG. 10 is a schematic diagram of a third structure of an optical communication apparatus according to an embodiment of the present invention.

As shown in FIG. 10, the optical communication apparatus includes:

a service determining unit 1001, configured to determine a to-be-recovered service upon detecting failure of a working path of a service; and an information determining unit 1002, configured to: search for local configuration information, where the local configuration information includes the service, a channel correlated with the service, and sub-APS overhead of the channel; and determine the sub-APS overhead of the channel correlated with the to-be-recovered service, according to the local configuration information and the to-be-recovered service; and an information processing unit 1003, configured to modify the sub-APS overhead of the channel correlated with the to-be-recovered service, and send the overhead to an optical communication apparatus adjacent to the channel correlated with the to-be-recovered service.

The information determining unit 1002 determining the sub-APS overhead of the channel correlated with the to-be-recovered service according to the local configuration information and the to-be-recovered service, includes:

in the local configuration information, matching the determined to-be-recovered service with the service, the channel correlated with the service, and the sub-APS overhead of the channel, and determining the sub-APS overhead of the channel correlated with the to-be-recovered service.

Figure 11:
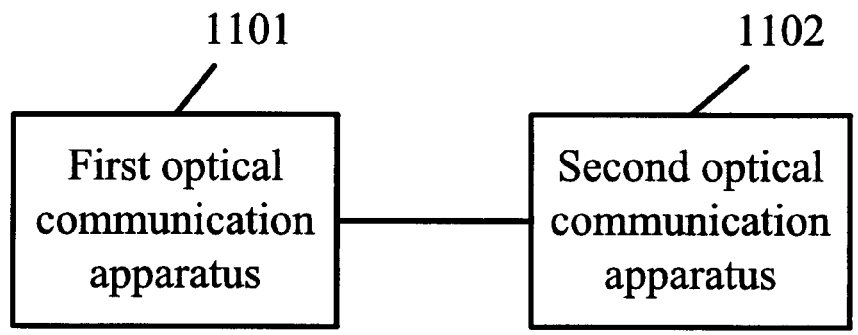
FIG. 11 is a schematic diagram of a first structure of an optical communication system according to an embodiment of the present invention.

FIG. 11 is a schematic diagram of a first structure of an optical communication system according to an embodiment of the present invention.

As shown in FIG. 11, the optical communication system includes:

a first optical communication apparatus 1101, configured to: determine a to-be-recovered service upon detecting failure of a working path of a service; search for local configuration information, where the local configuration information includes the service, a channel correlated with the service, and sub-automatic protection switching sub-APS overhead of the channel; determine the sub-APS overhead of the channel correlated with the to-be-recovered service, according to the local configuration information and the to-be-recovered service; and modify the sub-APS overhead of the channel correlated with the to-be-recovered service and send the overhead; and a second optical communication apparatus 1102, configured to: detect, according to the sub-APS overhead sent by the first optical communication apparatus 1101, that sub-APS overhead of a first channel of the second optical communication apparatus 1102 changes; search for local configuration information, where the local configuration information includes a service, a channel correlated with the service, and sub-APS overhead of the channel; according to the local configuration information and the sub-APS overhead of the first channel of the second optical communication apparatus 1102, determine a to-be-recovered service correlated with the sub-APS overhead of the first channel of the second optical communication apparatus 1102, and determine a second channel of the second optical communication apparatus 1102, where the second channel is correlated with the to-be-recovered service; and modify sub-APS overhead of the second channel correlated with the to-be-recovered service and send the overhead.

The first optical communication apparatus 1101 has the structure shown in FIG. 10, and the second optical communication apparatus 1102 has the structure shown in FIG. 8. For details, reference can be made to the description above.

Figure 12:
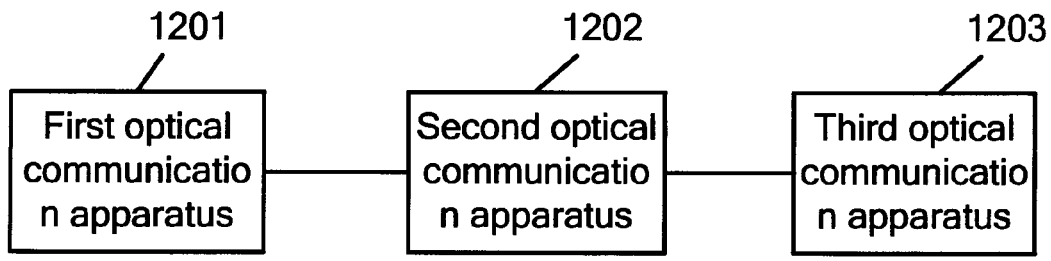
FIG. 12 is a schematic diagram of a second structure of an optical communication system according to an embodiment of the present invention.

FIG. 12 is a schematic diagram of a second structure of an optical communication system according to an embodiment of the present invention.

As shown in FIG. 12, the optical communication system includes:

a first optical communication apparatus 1201, configured to: determine a to-be-recovered service upon detecting failure of a working path of a service; search for local configuration information, where the local configuration information includes the service, a channel correlated with the service, and sub-APS overhead of the channel; determine the sub-APS overhead of the channel correlated with the to-be-recovered service, according to the local configuration information and the to-be-recovered service; and modify the sub-APS overhead of the channel correlated with the to-be-recovered service and send the overhead; and a second optical communication apparatus 1202, configured to: detect, according to the sub-APS overhead sent by the first optical communication apparatus 1202, that sub-APS overhead of a first channel of the second optical communication apparatus 1201 changes; search for local configuration information, where the local configuration information includes a service, a channel correlated with the service, and sub-APS overhead of the channel; according to the local configuration information and the sub-APS overhead of the first channel of the second optical communication apparatus 1202, determine a to-be-recovered service correlated with the sub-APS overhead of the first channel of the second optical communication apparatus 1202, and determine a second channel of the second optical communication apparatus 1202, where the second channel is correlated with the to-be-recovered service; and modify sub-APS overhead of the second channel correlated with the to-be-recovered service and send the overhead.

The system may further include:

a third optical communication apparatus 1203, configured to: detect, according to the sub-APS overhead of the second channel, that sub-APS overhead of a first channel of the third optical communication apparatus 1203 changes, where the sub-APS overhead of the second channel is sent by the second optical communication apparatus 1202; search for local configuration information, where the local configuration information includes a service, a channel correlated with the service, and sub-APS overhead of the channel; according to the local configuration information and the sub-APS overhead of the first channel of the third optical communication apparatus 1203, determine a to-be-recovered service correlated with the sub-APS overhead of the first channel of the third optical communication apparatus 1203, and determine a second channel of the third optical communication apparatus 1203, where the second channel is correlated with the to-be-recovered service; and bridge and switch the second channel of the third optical communication apparatus 1203 to the first channel of the third optical communication apparatus 1203, where the second channel is correlated with the to-be-recovered service.

The first optical communication apparatus 1201 has the structure shown in FIG. 10, the second optical communication apparatus 1202 has the structure shown in FIG. 8, and the third optical communication apparatus 1203 has the structure shown in FIG. 9. For details, reference can be made to the description above.

Figure 13:
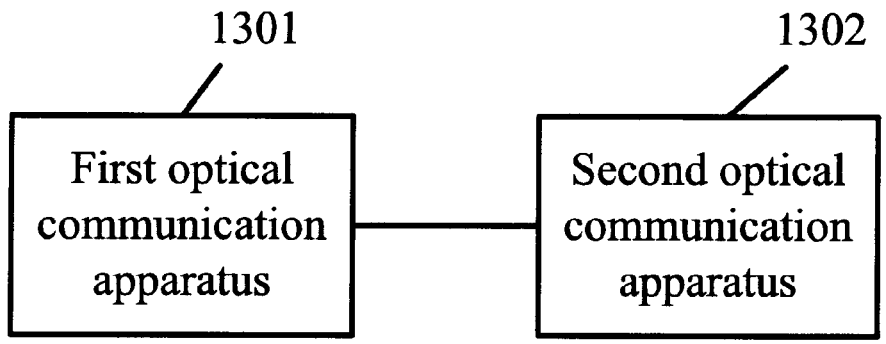
FIG. 13 is a schematic diagram of a third structure of an optical communication system according to an embodiment of the present invention.

FIG. 13 is a schematic diagram of a third structure of an optical communication system according to an embodiment of the present invention.

As shown in FIG. 13, the optical communication system includes:

a first optical communication apparatus 1301, configured to: determine a to-be-recovered service upon detecting failure of a working path of a service; search for local configuration information, where the local configuration information includes the service, a channel correlated with the service, and sub-APS overhead of the channel; determine the sub-APS overhead of the channel correlated with the to-be-recovered service, according to the local configuration information and the to-be-recovered service; and modify the sub-APS overhead of the channel correlated with the to-be-recovered service and send the overhead; and a second optical communication apparatus 1302, configured to: detect, according to the sub-APS overhead sent by the first optical communication apparatus 1301, that sub-APS overhead of a first channel of the second optical communication apparatus 1302 changes; search for local configuration information, where the local configuration information includes a service, a channel correlated with the service, and sub-APS overhead of the channel; according to the local configuration information and the sub-APS overhead of the first channel of the second optical communication apparatus 1302, determine a to-be-recovered service correlated with the sub-APS overhead of the first channel of the second optical communication apparatus 1302, and determine a second channel of the second optical communication apparatus 1302, where the second channel is correlated with the to-be-recovered service; and bridge and switch the second channel of the second optical communication apparatus 1302 to the first channel of the second optical communication apparatus 1302, where the second channel is correlated with the to-be-recovered service.

The first optical communication apparatus 1301 has the structure shown in FIG. 10, and the second optical communication apparatus 1302 has the structure shown in FIG. 9. For details, reference can be made to the description above.

Figure 14:
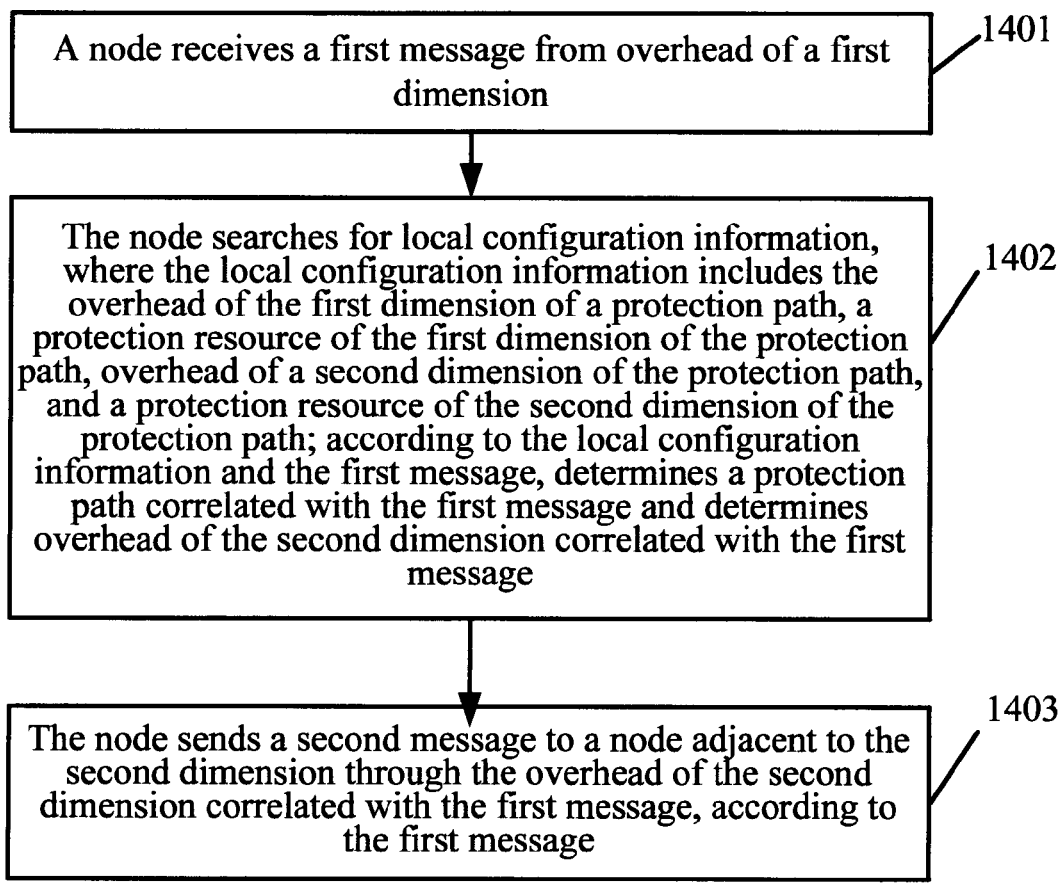
FIG. 14 is a flowchart of an information processing method in an optical network according to a sixth embodiment of the present invention.

FIG. 14 is a flowchart of an information processing method in an optical network according to a sixth embodiment of the present invention. The method includes the following steps:

Step 1401: A node receives a first message from overhead of a first dimension.

Step 1402: The node searches for local configuration information, where the local configuration information includes the overhead of the first dimension of a protection path, a protection resource of the first dimension of the protection path, overhead of a second dimension of the protection path, and a protection resource of the second dimension of the protection path; according to the local configuration information and the first message, determines a protection path correlated with the first message and determines the overhead of the second dimension correlated with the first message.

Step 1403: The node sends a second message to a node adjacent to the second dimension through the overhead of the second dimension correlated with the first message, according to the first message.

The dimensions in the embodiment of the present invention are relative, and different dimensions represent different directions.

The first message and the second message are protection switching messages; or the first message and the second message are protection path state messages.

The overhead is overhead of an optical network frame, and different overhead is used for transmitting messages of different protection paths.

The overhead is one of at least two portions that are generated by dividing APS overhead of a channel. Different overhead corresponds to messages of different protection paths.

After the determining the overhead of the second dimension correlated with the first message, the method further includes:

setting up a cross-connection between the protection resource of the first dimension and the protection resource of the second dimension for the protection path correlated with the first message.

Before the setting up the cross-connection between the protection resource of the first dimension and the protection resource of the second dimension for the protection path correlated with the first message, the method further includes: receiving a protection switching message from the overhead of the second dimension correlated with the first message.

Figure 15:
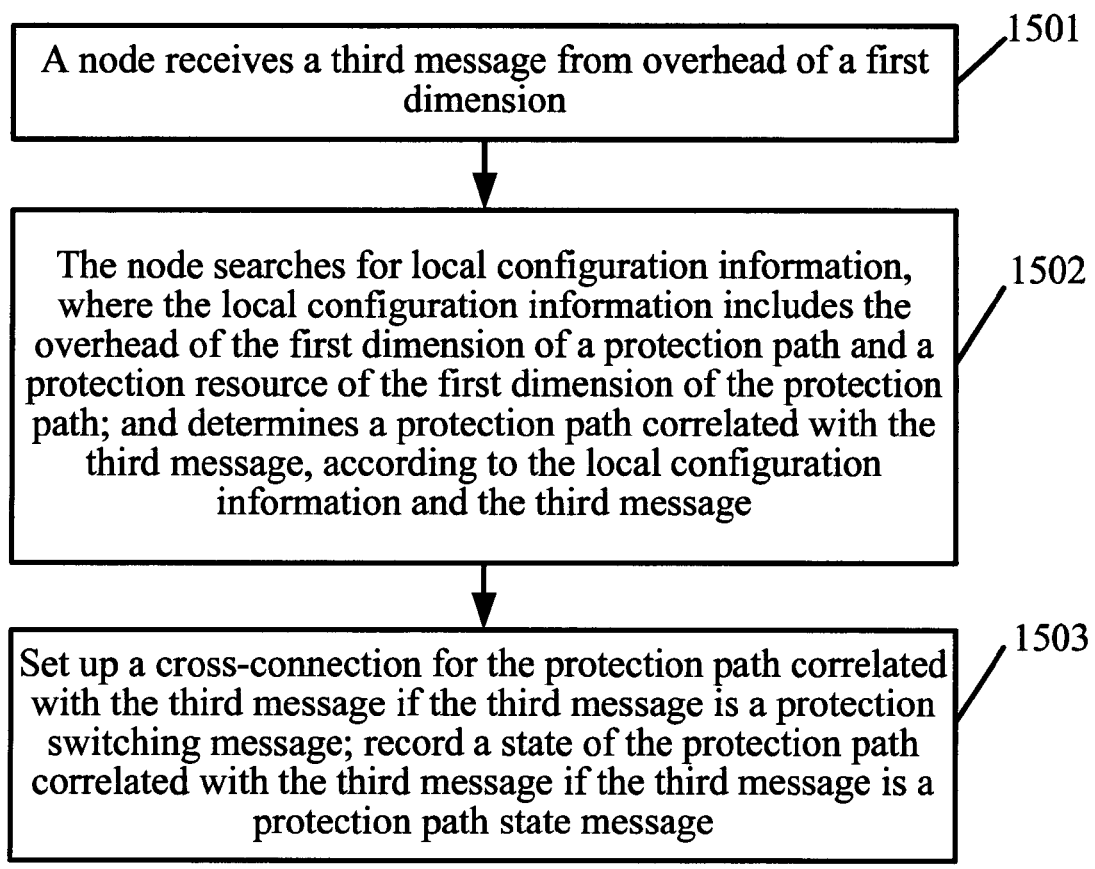
FIG. 15 is a flowchart of an information processing method in an optical network according to a seventh embodiment of the present invention.

FIG. 15 is a flowchart of an information processing method in an optical network according to a seventh embodiment of the present invention. The method mainly includes the following steps:

Step 1501: A node receives a third message from overhead of a first dimension.

Step 1502: The node searches for local configuration information, where the local configuration information includes the overhead of the first dimension of a protection path and a protection resource of the first dimension of the protection path; and determines a protection path correlated with the third message, according to the local configuration information and the third message.

Step 1503: Set up a cross-connection for the protection path correlated with the third message if the third message is a protection switching message; record the state of the protection path correlated with the third message if the third message is a protection path state message.

Figure 16:
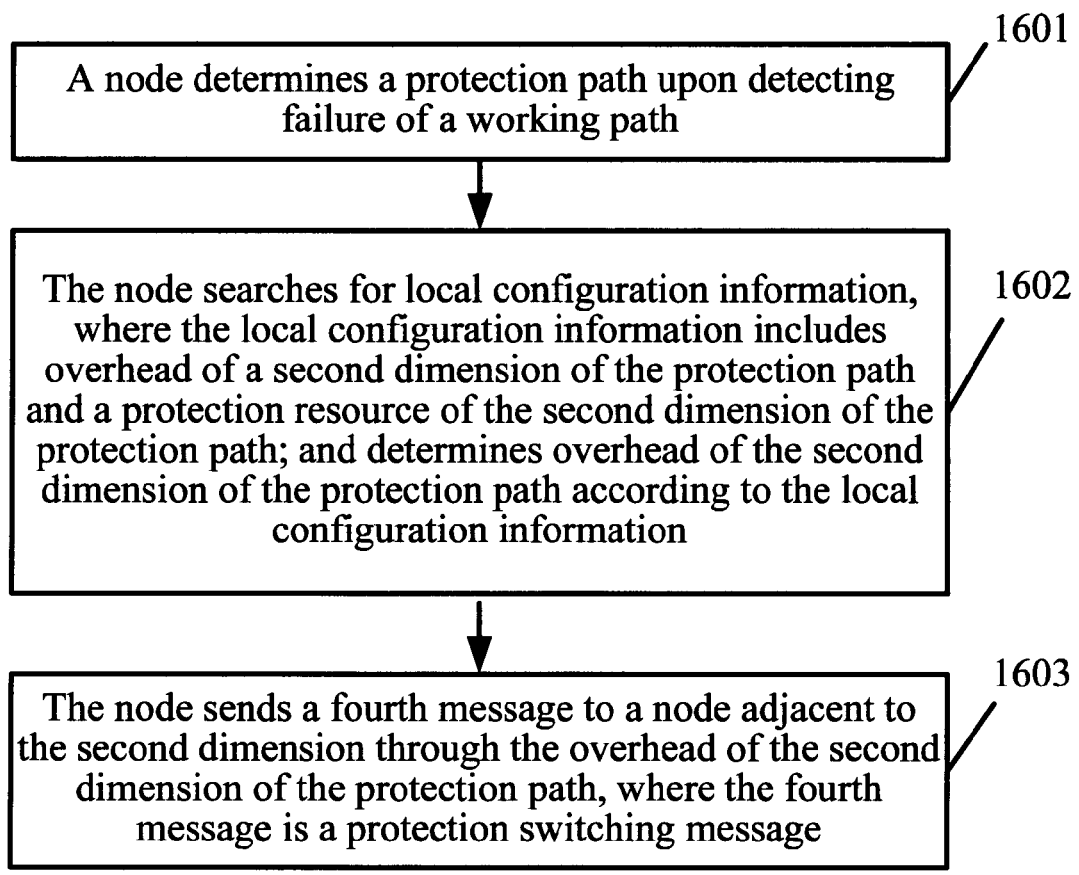
FIG. 16 is a flowchart of an information processing method in an optical network according to an eighth embodiment of the present invention.

FIG. 16 is a flowchart of an information processing method in an optical network according to an eighth embodiment of the present invention. The method mainly includes the following steps:

Step 1601: A node determines a protection path upon detecting failure of a working path.

Step 1602: The node searches for local configuration information, where the local configuration information includes overhead of a second dimension of the protection path and a protection resource of the second dimension of the protection path; and determines the overhead of the second dimension of the protection path according to the local configuration information.

Step 1603: The node sends a fourth message to a node adjacent to the second dimension through the overhead of the second dimension of the protection path, where the fourth message is a protection switching message.

Figure 17:
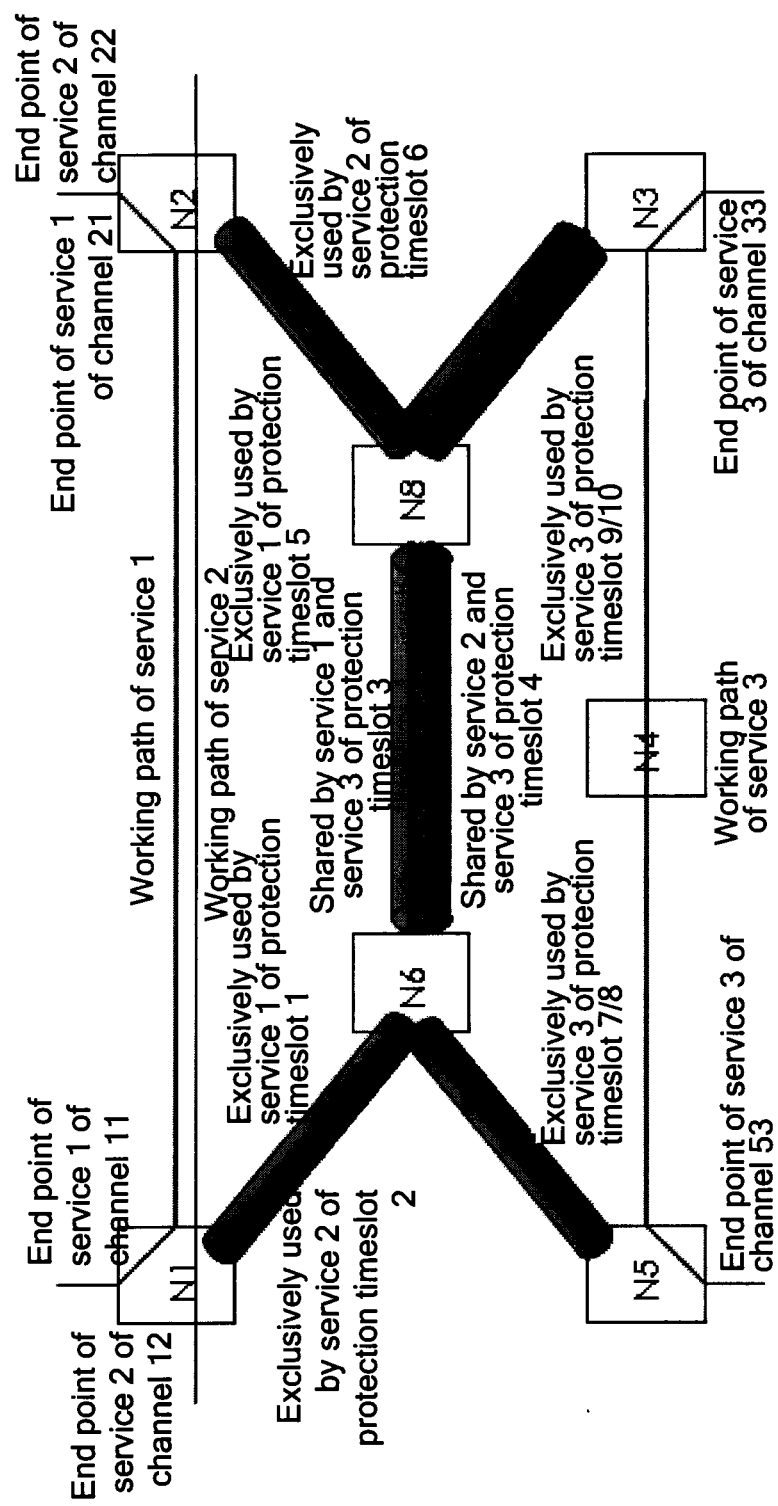
FIG. 17 is a schematic diagram of a network architecture according to a ninth embodiment of the present invention.

FIG. 17 is a schematic diagram of a network architecture according to a ninth embodiment of the present invention.

In FIG. 17, nodes N1 to N6, and N8 are included. Three protection paths are configured. Protection path 1 traverses N1-N6-N8-N2, protection path 2 traverses N1-N6-N8-N2, and protection path 3 traverses N5-N6-N8-N3. For protection path 1, protection information is configured on each traversed node; protection information of one dimension is configured on end nodes N1 and N2; protection information of two dimensions is configured on intermediate nodes N6 and N8. For example, it is required to configure protection information on N1 for a dimension directed to N6, to allocate overhead and protection resources, and to configure timeslot 1 as the protection resource of protection path 1 in the dimension.

For local configuration information on each node, reference can be made to Table 8 to Table 13. Dimensions in the tables are relative.

TABLE 8

Node N1 configuration information

| | | Dimension 1 | | Dimension 2 | |
|---|---|---|---|---|---|
| | Priority | Protection resource | Overhead number | Protection resource | Overhead number |
| Service 1 (ODU0) | 10 | ODU0 channel 11 | 0 | Protection timeslot 1 | 1 |
| Service 2 (ODU0) | 20 | ODU0 channel 12 | 0 | Protection timeslot 2 | 2 |

TABLE 9

Node N2 configuration information

| | | Dimension 1 | | Dimension 2 | |
|---|---|---|---|---|---|
| | Priority | Protection resource | Overhead number | Protection resource | Overhead number |
| Service 1 (ODU0) | 10 | ODU0 channel 21 | 0 | Protection timeslot 5 | 1 |
| Service 2 (ODU0) | 20 | ODU0 channel 22 | 0 | Protection timeslot 6 | 2 |

TABLE 10

Node N3 configuration information

| | | Dimension 1 | | Dimension 2 | |
|---|---|---|---|---|---|
| | Priority | Protection resource | Overhead number | Protection resource | Overhead number |
| Service 3 (ODU1) | 30 | ODU1 channel 33 | 0 | Protection timeslot 9/10 | 1 |

TABLE 11

Node N5 configuration information

| | | Dimension 1 | | Dimension 2 | |
|---|---|---|---|---|---|
| | Priority | Protection resource | Overhead number | Protection resource | Overhead number |
| Service 3 (ODU1) | 30 | ODU1 channel 53 | 0 | Protection timeslot 7/8 | 1 |

TABLE 12

Node N6 configuration information

| | | Dimension 1 | | Dimension 2 | |
|---|---|---|---|---|---|
| | Priority | Protection resource | Overhead number | Protection resource | Overhead number |
| Service 1 (ODU0) | 10 | Protection timeslot 1 | 1 | Protection timeslot 3 | 1 |
| Service 2 (ODU0) | 20 | Protection timeslot 2 | 2 | Protection timeslot 4 | 2 |
| Service 3 (ODU1) | 30 | Protection timeslot 7/8 | 1 | Protection timeslot 3/4 | 3 |

TABLE 13

Node N8 configuration information

| | | Dimension 1 | | Dimension 2 | |
|---|---|---|---|---|---|
| | Priority | Protection resource | Overhead number | Protection resource | Overhead number |
| Service 1 (ODU0) | 10 | Protection timeslot 5 | 1 | Protection timeslot 3 | 1 |
| Service 2 (ODU0) | 20 | Protection timeslot 6 | 2 | Protection timeslot 4 | 2 |
| Service 3 (ODU1) | 30 | Protection timeslot 9/10 | 1 | Protection timeslot 3/4 | 3 |

Figure 18:
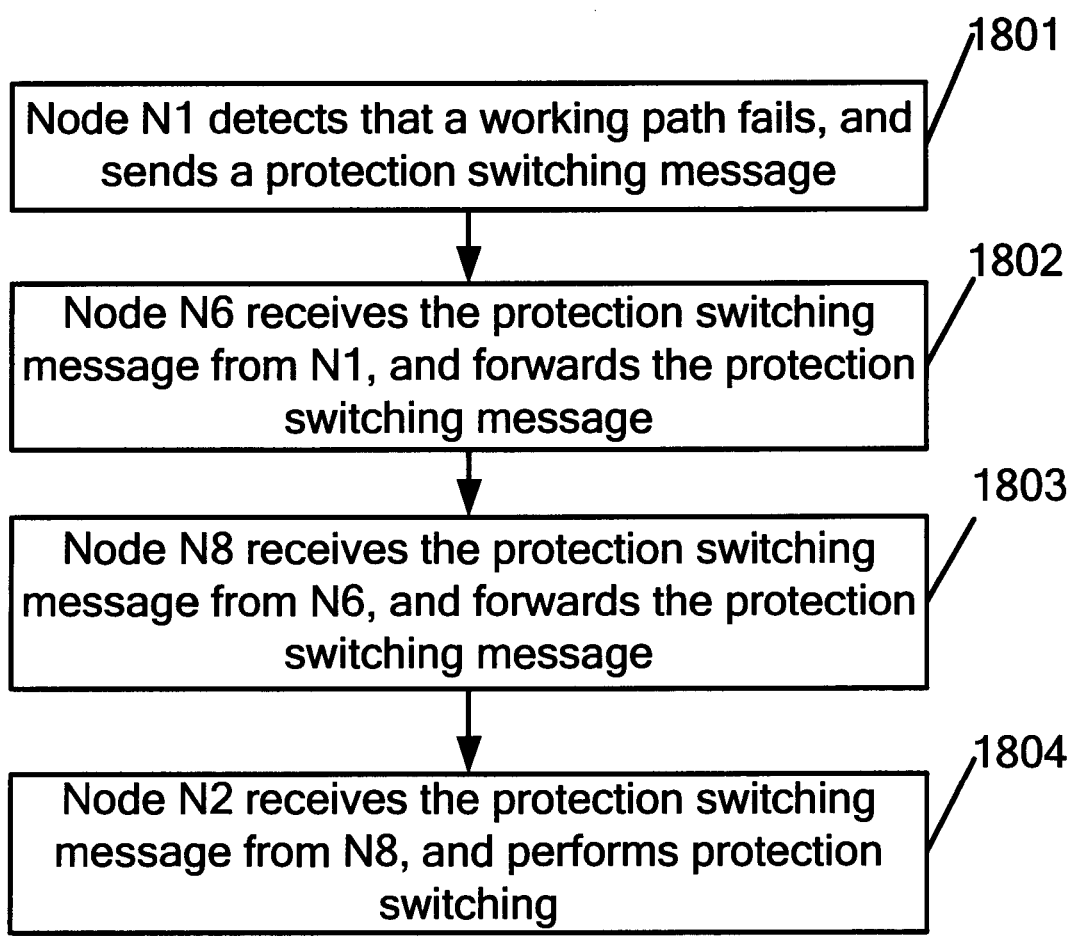
FIG. 18 is a flowchart of an information processing method in an optical network according to a ninth embodiment of the present invention.

FIG. 18 is a flowchart of an information processing method in an optical network according to a ninth embodiment of the present invention. The method includes the following steps:

Step 1801: Node N1 detects that a working path fails, and sends a protection switching message.

When the working path of service 1 fails, N1 detects the failure of service 1, and determines that protection path 1 needs to be recovered. N1 determines that the state of protection path 1 is normal, searches for local configuration information (Table 8), and determines that the overhead number of dimension 2 of protection path 1 is 1 and the protection resource of dimension 2 of protection path 1 is protection timeslot 1; N1 configures protection timeslot 1 as an ODU0 channel, bridges and switches service 1 to the ODU0 channel, and uses overhead numbered 1 in an OUT link corresponding to protection timeslot 1 to send the protection switching message to a node adjacent to dimension 2, namely, node N6.

Step 1802: Node N6 receives the protection switching message from N1, and forwards the protection switching message.

N6 receives the protection switching message from the overhead numbered 1 in the OTU link corresponding to protection timeslot 1, searches for the node N6 configuration information (Table 12), and learns that the overhead (dimension 1) numbered 1 in the OTU link corresponding to protection timeslot 1 is allocated to protection path 1 for use. Therefore, N6 configures protection timeslot 1 as one ODU0 channel, configures protection timeslot 3 as one ODU0 channel, sets up a cross-connection between the two ODU0 channels, and uses the overhead of dimension 2 of protection path 1 to send the protection switching message. The overhead is numbered 1.

Step 1803: Node N8 receives the protection switching message from N6, and forwards the protection switching message.

N8 receives the protection switching message from overhead numbered 1 in an OTU link corresponding to protection timeslot 3, searches for the node N8 configuration information (Table 13), and learns that the overhead (dimension 2) numbered 1 in the OTU link corresponding to protection timeslot 3 is allocated to protection path 1 for use. Therefore, N6 configures protection timeslot 3 as one ODU0 channel, configures protection timeslot 5 as one ODU0 channel, sets up a cross-connection between the two ODU0 channels, and uses the overhead of dimension 1 of protection path 1 to send the protection switching message. The overhead is numbered 1.

Step 1804: Node N2 receives the protection switching message from N8, and performs protection switching.

N2 receives the protection switching message from overhead numbered 1 in an OTU link corresponding to protection timeslot 5, searches for the node N2 configuration information (Table 9), and learns that the overhead (dimension 2) numbered 1 in the OTU link corresponding to protection timeslot 5 is allocated to protection path 1 for use. N2 is an end node of protection path 1. Therefore, N2 configures protection timeslot 5 as one ODU0 channel, and bridges and switches service 1 to the ODU0 channel. Then, service 1 is switched to protection path 1 and is recovered to normal.

After step 1804, N2 may use overhead corresponding to protection path 1 to transmit the protection switching message reversely, and N8 and N6 forward the message successively until N1 receives a protection switching message corresponding to protection path 1. At this time, N1 learns the switching service 1 is completed.

In step 1801, protection timeslot 1 is configured as one ODU0 channel, and the step of bridging and switching service 1 to the ODU0 channel may be performed after the protection switching message reversely transmitted by the node N6 is received. The same operation may be performed in step 1802 and step 1803. That is, a node does not set up a cross-connection until a protection switching message is sent and received in the same dimension. Therefore, recovery is performed more accurately.

When two ends (N1, N2) of the service detect the failure of the working path of service 1 simultaneously, N1 and N2 may initiate protection switching simultaneously.

To implement manual switching, an administrator delivers a command to an end point of a service, and a protection switching process is similar.

In the embodiment, the end node of the protection path needs to learn the state of the protection path before performing the protection switching. As shown in FIG. 17, an OTU link between N5 and N8 fails at a certain moment, which leads to signal failure, namely, failure of protection timeslot 9/10. Two end points of protection path 3 need to learn the failure and record the state of the protection path as signal failure. In this case, service 3 is prevented from automatically triggering protection switching, namely, it is prohibited to switch the service to protection path 3 when the working path of service 3 fails.

When the OTU link between N5 and N8 fails, nodes on two ends of the link can detect the failure. That is, N3 and N8 can detect the failure. N3 searches a protection configuration table, and finds that a timeslot in the failed OTU link is configured for the protection path of service 3. Because N3 is an end point of protection path 3, N3 updates the protection path state of protection path 3 to "signal failure". Another end point of protection path 3 finds the signal failure of protection path 3 in the following way:

N8 detects that the OTU link between N5 and N8 fails, searches for the local protection configuration information (Table 8), and finds that the timeslot (dimension 1) in the failed OTU link is configured for the protection path of service 3 and N8 is not an end point of protection path 3. N8 determines that the overhead number of dimension 2 of protection path 3 is 3, and uses overhead numbered 3 in an OTU link to which timeslot 3/4 belongs to send protection path state information to a node adjacent to dimension 2, namely, node N6, indicating that the path fails.

N6 receives the protection path state message from the overhead numbered 3 in the OTU link to which timeslot 3/4 belongs, searches for the node N6 configuration information (Table 12), and learns that the overhead (dimension 2) numbered 3 in the OTU link to which timeslot 3/4 belongs is configured for protection path 3 for use, and that N6 is not an end point of protection path 3. N6 determines that the overhead number of dimension 1 of protection path 3 is 1, and uses overhead numbered 1 in an OTU link to which timeslot 7/8 belongs to send the protection path state information to a node adjacent to dimension 1, namely, node N5, indicating that the path fails.

N5 receives the protection path state message from the overhead numbered 1 in the OTU link to which timeslot 7/8 belongs, searches for the node N5 configuration information (Table 11), and learns that the overhead numbered 1 in the OTU link to which timeslot 7/8 belongs is configured for protection path 3 for use; because N5 is an end point of service 3, the protection path state of protection path 3 is updated to "signal failure".

Figure 19:
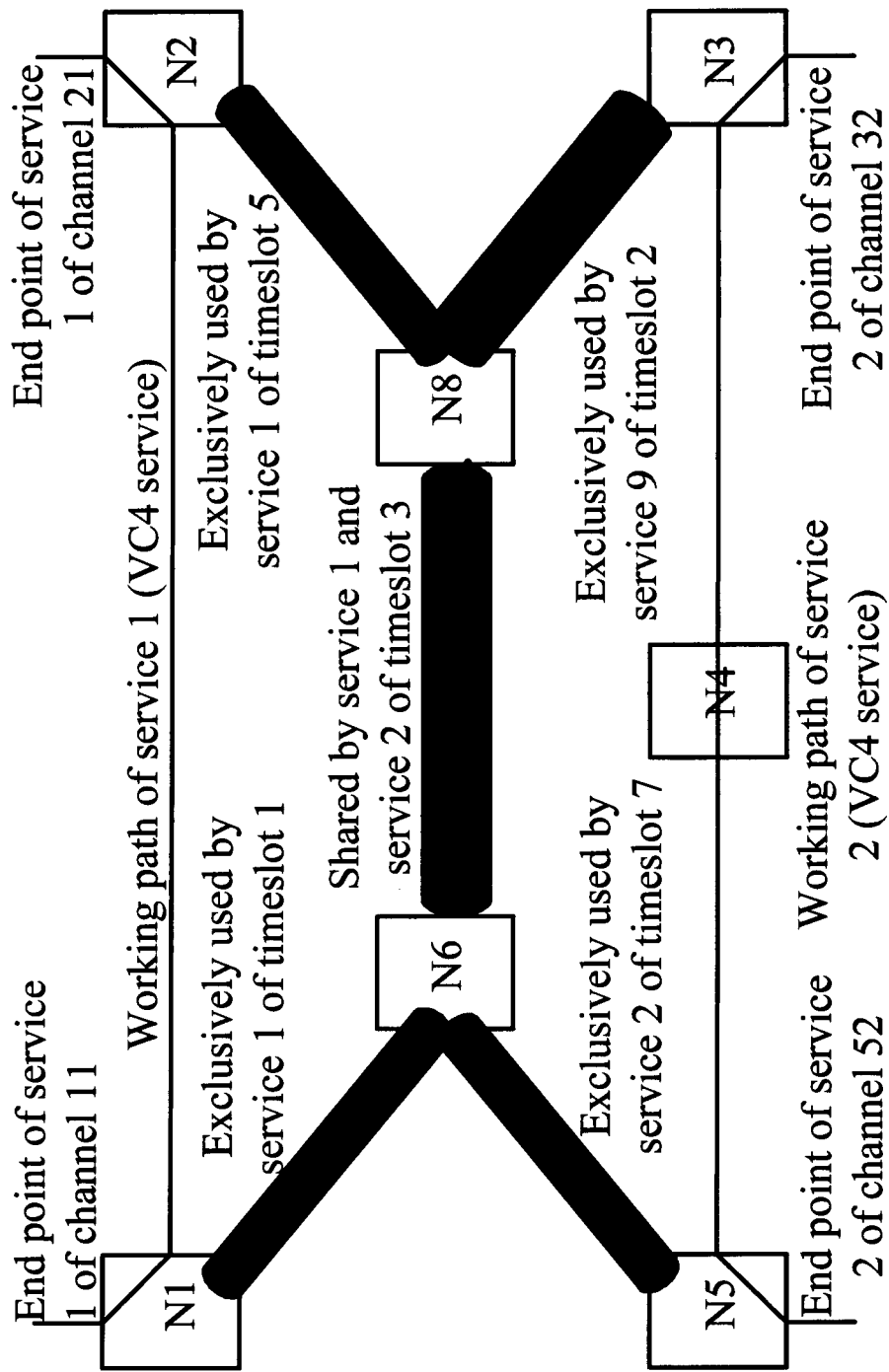
FIG. 19 is a schematic diagram of a network architecture according to a tenth embodiment of the present invention.

FIG. 19 is a schematic diagram of a network architecture according to a tenth embodiment of the present invention.

In FIG. 19, nodes N1 to N6, and N8 are included. In FIG. 19, the fine line represents the working path of each service, the thick pipeline represents an STM-1 link, and a bold line in the pipeline represents a VC4 protection timeslot in an STM-1 link. Two protection paths are configured. Protection path 1 traverses N1-N6-N8-N2, and protection path 2 traverses N5-N6-N8-N3. For protection path 1, protection information is configured on each traversed node; protection information of one dimension is configured on end nodes N1 and N2; protection information of two dimensions is configured on intermediate nodes N6 and N8. For example, it is required to configure protection information on N1 for the dimension directed to N6, to allocate overhead and protection resources, and to configure timeslot 1 as the protection resource of protection path 1 in the dimension.

For local configuration information on each node, reference can be made to Table 14 to Table 19. Dimensions in tables are relative.

TABLE 14

Node N1 configuration information

| | | Dimension 1 | | Dimension 2 | |
|---|---|---|---|---|---|
| | Priority | Protection resource | Overhead number | Protection resource | Overhead number |
| Service 1 (VC4) | 10 | VC4 channel 11 | 0 | Timeslot 1 | 1 |

TABLE 15

Node N2 configuration information

| | | Dimension 1 | | Dimension 2 | |
|---|---|---|---|---|---|
| | Priority | Protection resource | Overhead number | Protection resource | Overhead number |
| Service 1 (VC4) | 10 | VC4 channel 21 | 0 | 5Timeslot 5 | 1 |

TABLE 16

Node N3 configuration information

| | | Dimension 1 | | Dimension 2 | |
|---|---|---|---|---|---|
| | Priority | Protection resource | Overhead number | Protection resource | Overhead number |
| Service 2 (VC4) | 20 | VC4 channel 32 | 0 | Timeslot 9 | 1 |

TABLE 17

Node N5 configuration information

| | | Dimension 1 | | Dimension 2 | |
|---|---|---|---|---|---|
| | Priority | Protection resource | Overhead number | Protection resource | Overhead number |
| Service 2 (VC4) | 20 | VC4 channel 52 | 0 | Timeslot 7 | 1 |

TABLE 18

Node N6 configuration information

| | | Dimension 1 | | Dimension 2 | |
|---|---|---|---|---|---|
| | Priority | Protection resource | Overhead number | Protection resource | Overhead number |
| Service 1 (VC4) | 10 | Timeslot 1 | 1 | Timeslot 3 | 1 |
| Service 2 (VC4) | 20 | Timeslot 7 | 1 | Timeslot 3 | 2 |

TABLE 19

Node N8 configuration information

| | | Dimension 1 | | Dimension 2 | |
|---|---|---|---|---|---|
| | Priority | Protection resource | Overhead number | Protection resource | Overhead number |
| Service 1 (VC4) | 10 | Timeslot 5 | 1 | Timeslot 3 | 1 |
| Service 2 (VC4) | 20 | Timeslot 9 | 1 | Timeslot 3 | 2 |

Figure 20:
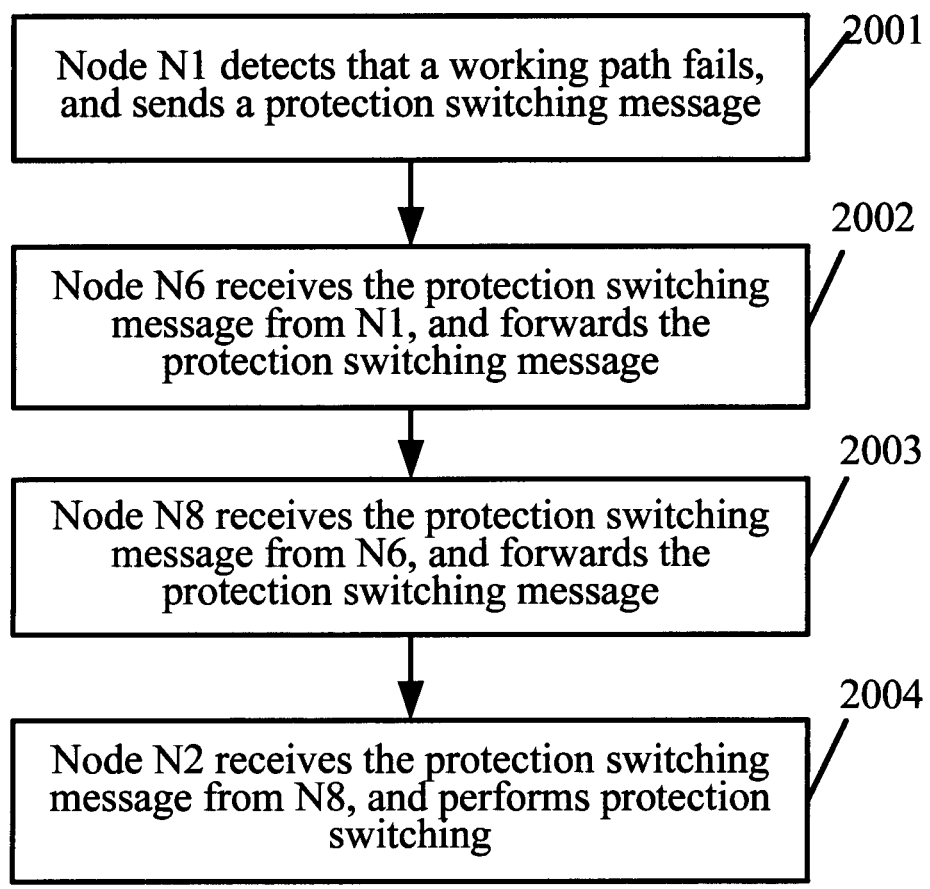
FIG. 20 is a flowchart of an information processing method in an optical network according to a tenth embodiment of the present invention.

FIG. 20 is a flowchart of an information processing method in an optical network according to a tenth embodiment of the present invention. The method includes the following steps:

Step 2001: Node N1 detects that a working path fails, and sends a protection switching message.

When the working path of service 1 fails, N1 detects the failure of service 1, and determines that protection path 1 needs to be recovered. N1 searches for the local configuration information (Table 14), and determines that overhead number of dimension 2 of protection path 1 is 1 and that a protection resource of dimension 2 of protection path 1 is timeslot 1; N1 bridges and switches service 1 to a VC4 timeslot, and uses overhead numbered 1 in an STM-1 link corresponding to timeslot 1 to send a protection switching message to a node adjacent to dimension 2, namely, node N6.

Step 2002: Node N6 receives the protection switching message from N1, and forwards the protection switching message.

N6 receives the protection switching message from the overhead numbered 1 in the STM-1 link corresponding to timeslot 1, searches for the node N6 configuration information (Table 18), and learns that the overhead (dimension 1) numbered 1 in the STM-1 link corresponding to timeslot 1 is allocated to protection path 1 for use. Therefore, N6 sets up a cross-connection between timeslot 1 of dimension 1 and timeslot 3 of dimension 2, and uses the overhead of dimension 2 of protection path 1 to send the protection switching message. The overhead is numbered 1.

Step 2003: Node N8 receives the protection switching message from N6, and forwards the protection switching message.

N8 receives the protection switching message from overhead numbered 1 in an STM-1 link corresponding to timeslot 3, searches for the node N8 configuration information (Table 19), and learns that the overhead (dimension 2) numbered 1 in the OTU link corresponding to timeslot 3 is allocated to protection path 1 for use. Therefore, N8 sets up a cross-connection between timeslot 5 of dimension 1 and timeslot 3 of dimension 2, and uses the overhead of dimension 1 of protection path 1 to send the protection switching message. The overhead is numbered 1.

Step 2004: Node N2 receives the protection switching message from N8, and performs protection switching.

N2 receives the protection switching message from overhead numbered 1 in an STM-1 link corresponding to timeslot 5, searches for the node N2 configuration information (Table 15), and learns that the overhead (dimension 2) numbered 1 in the STM-1 link corresponding to timeslot 5 is allocated to protection path 1 for use. Because N2 is an end node of protection path 1, N2 bridges and switches service 1 to a VC4 channel. Then, service 1 is switched to protection path 1 and is recovered to normal.

After step 2004, N2 may use overhead corresponding to protection path 1 to transmit the protection switching message reversely, and N8 and N6 forward the message successively until N1 receives a protection switching message corresponding to protection path 1. At this time, N1 learns the switching service 1 is completed.

In step 2001, the step of bridging and switching service 1 to the VC4 timeslot may be performed after the protection switching message reversely transmitted by the node N6 is received. The same operation may be performed in step 2002 and step 2003. That is, a node does not set up a cross-connection until a protection switching message is sent and received in the same dimension.

When two ends (N1, N2) of the service detect the failure of the working path of service 1 simultaneously, N1 and N2 may initiate protection switching simultaneously.

To implement manual switching, an administrator delivers a command to an end point of a service, and a protection switching process is similar.

Figure 21:
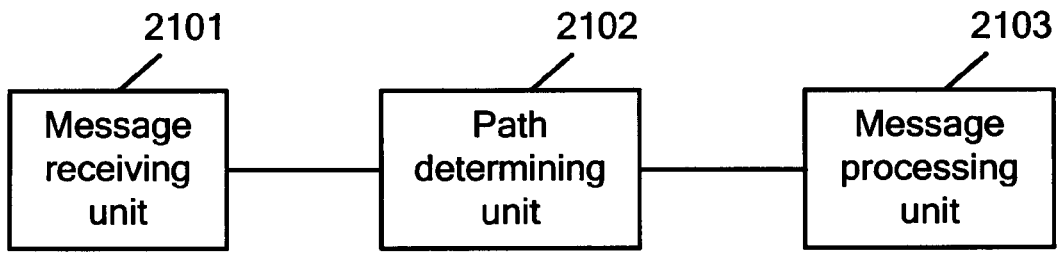
FIG. 21 is a schematic structural diagram of an optical communication apparatus according to an embodiment of the present invention.

FIG. 21 is a schematic structural diagram of an optical communication apparatus according to an embodiment of the present invention. The optical communication apparatus includes:

a message receiving unit 2101, configured to receive a first message from overhead of a first dimension;

a path determining unit 2102, configured to: search for local configuration information, where the local configuration information includes the overhead of the first dimension of a protection path, a protection resource of the first dimension of the protection path, overhead of a second dimension of the protection path, and a protection resource of the second dimension of the protection path; according to the local configuration information and the first message, determine a protection path correlated with the first message and determine overhead of the second dimension correlated with the first message; and a message processing unit 2103, configured to send a second message to a node adjacent to the second dimension through the overhead of the second dimension correlated with the first message, according to the first message.

Figure 22:
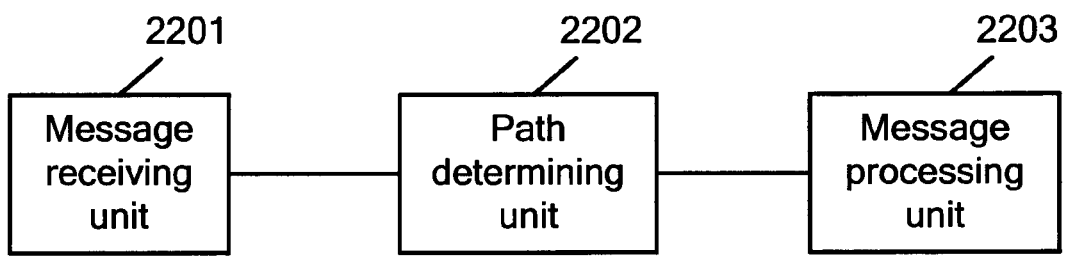
FIG. 22 is a schematic structural diagram of another optical communication apparatus according to an embodiment of the present invention.

FIG. 22 is a schematic structural diagram of an optical communication apparatus according to an embodiment of the present invention. The optical communication apparatus includes:

a message receiving unit 2201, configured to receive a third message from overhead of a first dimension;

a path determining unit 2202, configured to search for local configuration information, where the local configuration information includes the overhead of the first dimension of a protection path and a protection resource of the first dimension of the protection path; and according to the local configuration information and the third message, determine a protection path correlated with the third message; and a message processing unit 2203, configured to set up a cross-connection for the protection path correlated with the third message if the third message is a protection switching message, and record a state of the protection path correlated with the third message if the third message is a protection path state message.

Figure 23:
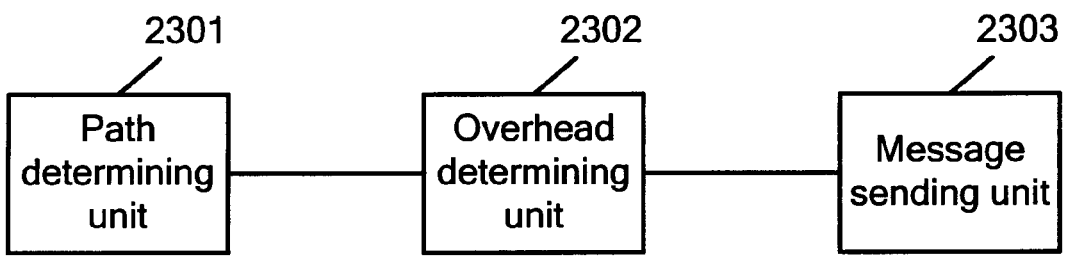
FIG. 23 is a schematic structural diagram of still another optical communication apparatus according to an embodiment of the present invention.

FIG. 23 is a schematic structural diagram of an optical communication apparatus according to an embodiment of the present invention. The optical communication apparatus includes:

a path determining unit 2301, configured to determine a protection path upon detecting failure of a working path;

an overhead determining unit 2302, configured to search for local configuration information, where the local configuration information includes overhead of a second dimension of the protection path and a protection resource of the second dimension of the protection path; and determine the overhead of the second dimension of the protection path according to the local configuration information; and a message sending unit 2303, configured to send a fourth message to a node adjacent to the second dimension through the overhead of the second dimension of the protection path, where the fourth message is a protection switching message.

Figure 24:
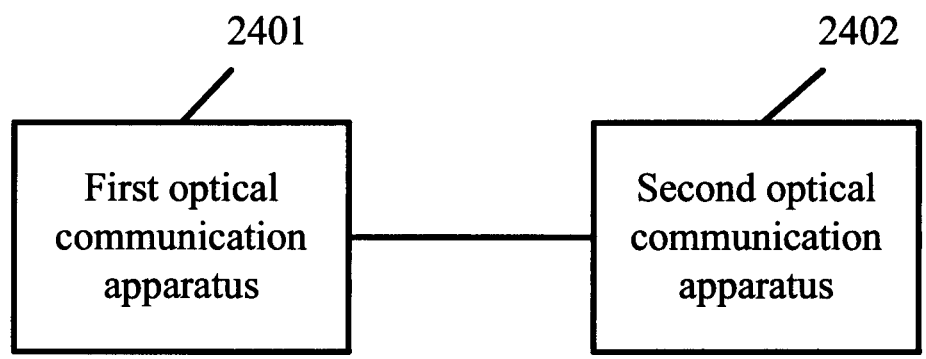
FIG. 24 is a schematic structural diagram of an optical communication system according to an embodiment of the present invention.

FIG. 24 is a schematic structural diagram of an optical communication system according to an embodiment of the present invention. The optical communication system includes:

a first optical communication apparatus 2401, configured to: determine a protection path upon detecting failure of a working path; search for local configuration information, where the local configuration information includes overhead of a second dimension of the protection path and a protection resource of the second dimension of the protection path; and determine the overhead of the second dimension of the protection path in the first optical communication apparatus according to the local configuration information; and send a fourth message to a node adjacent to the second dimension of the first optical communication apparatus through the overhead of the second dimension of the protection path in the first optical communication apparatus, where the fourth message is a protection switching message; and a second optical communication apparatus 2402, configured to: receive a third message from overhead of a first dimension of the second optical communication apparatus; search for local configuration information, where the local configuration information includes the overhead of the first dimension of the protection path and a protection resource of the first dimension of the protection path; and determine a protection path correlated with the third message according to the local configuration information and the third message, where the third message is a protection switching message; and set up a cross-connection for the protection path correlated with the third message.

The optical communication system further includes:

The node adjacent to the second dimension of the first optical communication apparatus is the second optical communication apparatus; and The third message received by the second optical communication apparatus from the overhead of the first dimension of the second optical communication apparatus is a fourth message sent by the first optical communication apparatus.

The optical communication system further includes:

a third optical communication apparatus, configured to: receive a first message from overhead of a first dimension of the third optical communication apparatus; search for local configuration information, where the local configuration information includes the overhead of the first dimension of a protection path, a protection resource of the first dimension of the protection path, overhead of a second dimension of the protection path, and a protection resource of the second dimension of the protection path; according to the local configuration information and the first message, determine a protection path correlated with the first message and determine the overhead of the second dimension of the third optical communication apparatus, where the overhead of the second dimension of the third optical communication apparatus is correlated with the first message; and send a second message to a node adjacent to the second dimension through the overhead of the second dimension of the third optical communication apparatus according to the first message, where the overhead of the second dimension of the third optical communication apparatus is correlated with the first message.

The node adjacent to the second dimension of the first optical communication apparatus is the third optical communication apparatus, and the node adjacent to the second dimension of the third optical communication apparatus is the second optical communication apparatus.

The first message received by the third optical communication apparatus from the overhead of the first dimension of the third optical communication apparatus is the fourth message sent by the first optical communication apparatus, and the third message received by the second optical communication apparatus from the overhead of the first dimension of the second optical communication apparatus is the second message sent by the third optical communication apparatus.

It should be noted that information exchange between each unit in the apparatus and system above, the implementation processes and other content are based on the same conception as the method embodiment of the present invention, and therefore, reference can be made to the description in the method embodiment of the present invention for detailed content, and details are not further described repeated herein.

In conclusion, in the technical solutions of the present invention, the node receives the first message from the overhead of the first dimension; the node searches for the local configuration information, where the local configuration information includes the overhead of the first dimension of the protection path, the protection resource of the first dimension of the protection path, the overhead of the second dimension of the protection path, and the protection resource of the second dimension of the protection path; according to the local configuration information and the first message, the node determines the protection path correlated with the first message and determines the overhead of the second dimension correlated with the first message; and the node sends the second message to the node adjacent to the second dimension through the overhead of the second dimension correlated with the first message, according to the first message. Because sub-APS overhead is sent through a data plane to indicate recovery information, a signaling protocol is generally simple; moreover, local configuration information is set locally and can be used for searching for relevant information. In this way, the recovery information can be obtained simply and information processing complexity is reduced.

Persons of ordinary skill in the art shall understand that all or part of the steps of the methods in the embodiments of the present invention may be implemented by a program instructing relevant hardware. The program may be stored in computer readable storage media. The storage media may include: read-only memory (ROM, Read Only Memory), random access memory (RAM, Random Access Memory), magnetic disk, or CD-ROM.

The above description gives details about an information processing method in an optical network, an apparatus, and a system provided in the embodiments of the present invention. The specification adopts specific examples to describe the principle and embodiments of the present invention, and the description of the embodiments above is only for better understanding the method and core idea of the present invention. On the basis of the idea of the present invention, persons skilled in the art can make modifications and variations to the specific embodiments and application scope of the present invention. In conclusion, the content of the specification should not be construed as a limitation on the present invention.

What is claimed is:

1. An information processing method in an optical network, comprising:
   receiving, by a node, a first message from overhead of a first dimension;
   searching for local configuration information, wherein the local configuration information comprises the overhead of the first dimension of a protection path, a protection resource of the first dimension of the protection path, overhead of a second dimension of the protection path, and a protection resource of the second dimension of the protection path; according to the local configuration information and the first message, determining a protection path correlated with the first message and determining overhead of the second dimension correlated with the first message; and
   sending a second message to a node adjacent to the second dimension through the overhead of the second dimension correlated with the first message, according to the first message.

2. The information processing method in an optical network according to claim 1, wherein:
   the first message and the second message are protection switching messages.

3. The information processing method in an optical network according to claim 1, wherein:
   the first message and the second message are protection path state messages.

4. The information processing method in an optical network according to claim 1, wherein:
   the overhead is overhead of an optical network frame, and different overhead is used to transmit messages of different protection paths.

5. The information processing method in an optical network according to claim 1, wherein:
   the overhead is one of at least two portions that are generated by dividing APS overhead of a channel, and different overhead corresponds to messages of different protection paths.

6. The information processing method in an optical network according to claim 2, wherein:
   after the determining the overhead of the second dimension correlated with the first message, the method further comprises:
   setting up a cross-connection between the protection resource of the first dimension and the protection resource of the second dimension for the protection path correlated with the first message.

7. The information processing method in an optical network according to claim 6, wherein:
   Before the setting up the cross-connection between the protection resource of the first dimension and the protection resource of the second dimension for the protection path correlated with the first message, the method further comprises: receiving a protection switching message from the overhead of the second dimension correlated with the first message.

8. An information processing method in an optical network, comprising:
   receiving, by a node, a third message from overhead of a first dimension;
   searching for local configuration information, wherein the local configuration information comprises the overhead of the first dimension of a protection path and a protection resource of the first dimension of the protection path; and determining a protection path correlated with the third message, according to the local configuration information and the third message;
   setting up a cross-connection for the protection path correlated with the third message if the third message is a protection switching message;
   recording a state of the protection path correlated with the third message if the third message is a protection path state message.

9. An information processing method in an optical network, comprising:
   determining, by a node, a protection path upon detecting failure of a working path;
   searching for local configuration information, wherein the local configuration information comprises overhead of a second dimension of the protection path and a protection resource of the second dimension of the protection path; and determining the overhead of the second dimension of the protection path according to the local configuration information; and
   sending a fourth message to a node adjacent to the second dimension through the overhead of the second dimension of the protection path, wherein the fourth message is a protection switching message.

10. The information processing method in an optical network according to claim 9, wherein:
    after the determining the overhead of the second dimension of the protection path, the method further comprises:
    setting up a cross-connection for the protection path; or
    setting up a cross-connection for the protection path after receiving a protection switching message from the overhead of the second dimension.

11. An optical communication system, comprising:
    a first optical communication apparatus, configured to: determine a protection path upon detecting failure of a working path; search for local configuration information, wherein the local configuration information comprises overhead of a second dimension of the protection path and a protection resource of the second dimension of the protection path; and determine overhead of the second dimension of the protection path in the first optical communication apparatus according to the local configuration information; and send a fourth message to a node adjacent to the second dimension of the first optical communication apparatus through the overhead of the second dimension of the protection path in the first optical communication apparatus, wherein the fourth message is a protection switching message; and
    a second optical communication apparatus, configured to: receive a third message from overhead of a first dimension of the second optical communication apparatus; search for local configuration information, wherein the local configuration information comprises the overhead of the first dimension of the protection path and a protection resource of the first dimension of the protection path; and determine the protection path correlated with the third message, according to the local configuration information and the third message, wherein the third message is a protection switching message; and set up a cross-connection for the protection path correlated with the third message.

12. The optical communication system according to claim 11, wherein:
the node adjacent to the second dimension of the first optical communication apparatus is the second optical communication apparatus; and
the third message received by the second optical communication apparatus from the overhead of the first dimension of the second optical communication apparatus is the fourth message sent by the first optical communication apparatus.

13. The optical communication system according to claim 11, further comprising:
a third optical communication apparatus, configured to: receive a first message from overhead of a first dimension of the third optical communication apparatus; search for local configuration information, wherein the local configuration information comprises the overhead of the first dimension of a protection path, the protection resource of the first dimension of the protection path, overhead of a second dimension of the protection path, and a protection resource of the second dimension of the protection path; according to the local configuration information and the first message, determine a protection path correlated with the first message and determine overhead of the second dimension of the third optical communication apparatus, wherein the overhead of the second dimension of the third optical communication apparatus is correlated with the first message; and send a second message to a node adjacent to the second dimension through the overhead of the second dimension of the third optical communication apparatus according to the first message, wherein the overhead of the second dimension of the third optical communication apparatus is correlated with the first message, wherein
the node adjacent to the second dimension of the first optical communication apparatus is the third optical communication apparatus, and the node adjacent to the second dimension of the third optical communication apparatus is the second optical communication apparatus; and
the first message received by the third optical communication apparatus from the overhead of the first dimension of the third optical communication apparatus is the fourth message sent by the first optical communication apparatus, and the third message received by the second optical communication apparatus from the overhead of the first dimension of the second optical communication apparatus is the second message sent by the third optical communication apparatus.

\* \* \* \* \*